(12) United States Patent
Kolenc et al.

(10) Patent No.: US 8,090,460 B2
(45) Date of Patent: ***Jan. 3, 2012

(54) SYSTEM AND METHOD FOR PROTECTION SYSTEM DESIGN SUPPORT

(75) Inventors: Josh Kolenc, Sherwood Park (CA); H. James Hoover, Edmonton (CA); Antony G. Olekshy, Edmonton (CA); Paulette Meaux Saunders, Lake Charles, LA (US)

(73) Assignee: Curtiss-Wright Flow Control Corporation, Parsippany, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/486,366

(22) Filed: Jun. 17, 2009

(65) Prior Publication Data

US 2010/0017004 A1    Jan. 21, 2010

Related U.S. Application Data

(63) Continuation of application No. 11/016,001, filed on Dec. 17, 2004, now Pat. No. 7,617,013.

(60) Provisional application No. 60/530,724, filed on Dec. 18, 2003.

(51) Int. Cl.
*G06F 19/00* (2011.01)

(52) U.S. Cl. ............................... 700/97; 700/109

(58) Field of Classification Search ............... 700/97, 700/109–111, 188, 182, 13; 702/182; 707/102; 710/36; 717/106, 162, 110; 701/99
See application file for complete search history.

(56) References Cited

U.S. PATENT DOCUMENTS

| 4,745,572 | A | 5/1988 | Wilburn | |
|---|---|---|---|---|
| 5,774,372 | A | 6/1998 | Berwanger | |
| 6,049,334 | A | 4/2000 | Bates et al. | |
| 6,385,497 | B1 | 5/2002 | Ogushi et al. | |
| 7,032,816 | B2 * | 4/2006 | Markham et al. | 235/376 |
| 2002/0013635 | A1 | 1/2002 | Gotou et al. | |
| 2002/0183880 | A1 | 12/2002 | Arima et al. | |
| 2003/0114946 | A1 | 6/2003 | Kitchen | |
| 2003/0158795 | A1 * | 8/2003 | Markham et al. | 705/28 |
| 2004/0002990 | A1 | 1/2004 | Sander et al. | |
| 2006/0149407 | A1 | 7/2006 | Markham et al. | |
| 2006/0191993 | A1 * | 8/2006 | Markham et al. | 235/376 |

OTHER PUBLICATIONS

Hoover, James H., Tony Olekshy, Garry Froehlich, and Paul Sorenson, Dept.of Computing Science, University of Alberta, Edmonton, Alberta: Avra Software Lab Inc., Edmonton, Alberta. "Developing Engineered Product Support Applications:".
Edwards, John E., Relief and Blowdown in Batch Processes, European ChemCad Symposium 1999, pp. 1-20.
International Search Report, dated Nov. 3, 2005.

* cited by examiner

*Primary Examiner* — Kidest Bahta
(74) *Attorney, Agent, or Firm* — Pearne & Gordon LLP

(57) ABSTRACT

A method and system for examining, auditing, and safely evaluating process systems, including fluid pressure systems, to aid overpressure design and/or sizing of overpressure equipment. The system includes a server subsystem, a storage subsystem, an assessment subsystem, and optionally a report generation subsystem, including computer hardware and application software for supporting these subsystems.

44 Claims, 32 Drawing Sheets

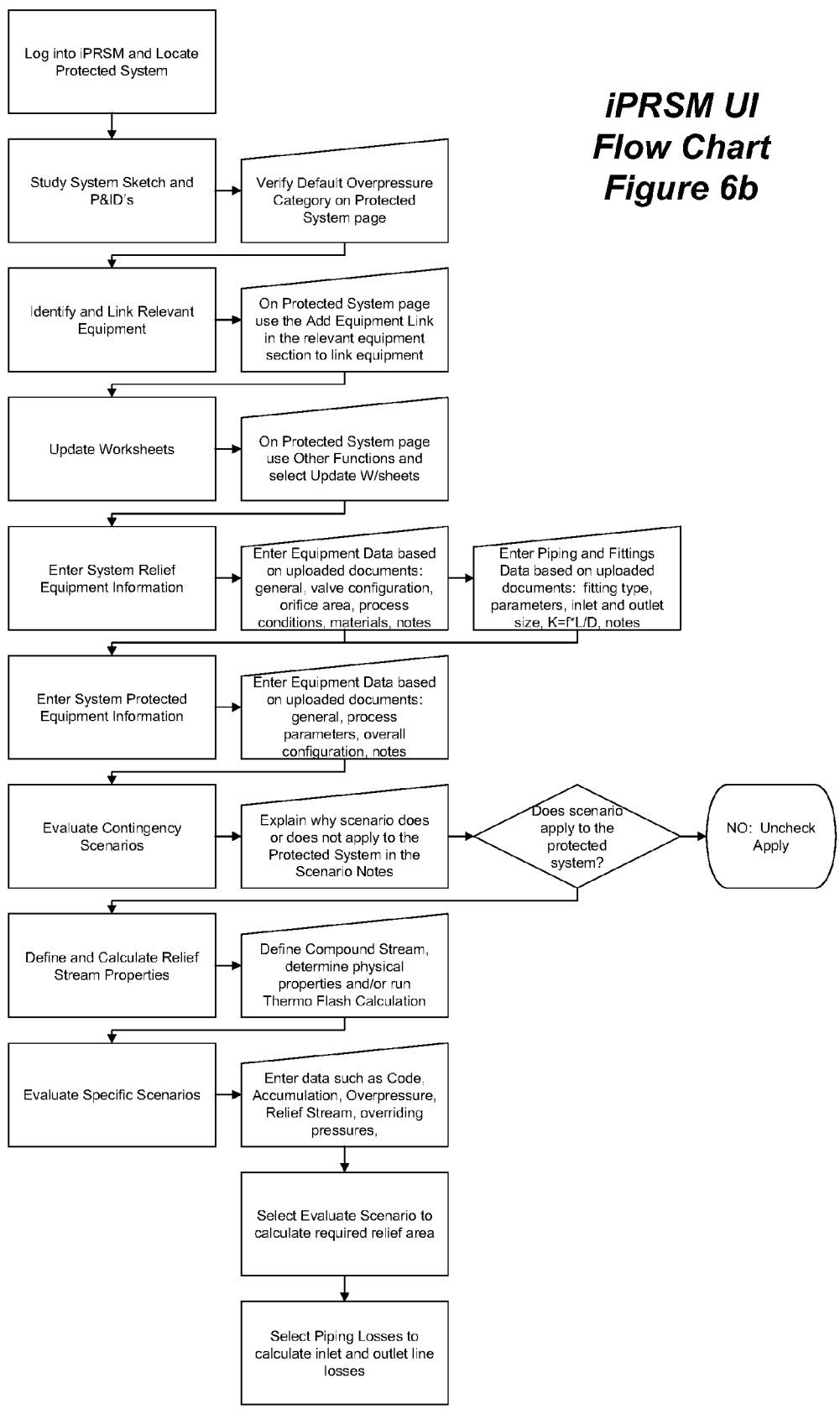
*iPRSM UI Flow Chart Figure 6b*

Figure 8M iPRSM : Standalone
Device Worksheet Specifications

• Add Device

| Device Type Pick to Edit | Device Name | Protection Rate | Current Version |
|---|---|---|---|
| BV | Block Valve | | 1.0.7.28 |
| CV | Control Valve | | 1.0.7.28 |
| Comp | Compressor | | 1.0.7.28 |
| Comp-P | Comp't - Protected | Protected | 1.0.7.28 |
| HExS | Heat Exch S/S | Protected | 1.0.7.28 |
| HtTS | Heat Exch T/S | Protected | 1.0.7.28 |
| Heater | Heater | | 1.0.7.28 |
| PRV | Relief Valve | Protects | 1.0.7.28 |
| Pipe-P | Pipe - Protected | Protected | 1.0.7.28 |
| Pump | Pump | | 1.0.7.28 |
| Pump-P | Pump - Protected | Protected | 1.0.7.28 |
| RD | Rupture Disk | Protects | 1.0.7.28 |
| TV | Tank Vent | Protects | 1.0.7.28 |
| Tank | Tank | Protected | 1.0.7.28 |
| Turbine-S | Turbine - Steam | Protected | 1.0.7.28 |
| Vessel | Vessel | Protected | 1.0.7.28 |

SYSTEM AND METHOD FOR PROTECTION SYSTEM DESIGN SUPPORT

CROSS-REFERENCES TO RELATED APPLICATIONS

This application is a continuation of U.S. Utility patent application Ser. No. 11/016,001, filed on Dec. 17, 2004, incorporated by reference in its entirety including the Computer Program Listing Appendix incorporated therein, and which claims the benefit of provisional application Ser. No. 60/530,724, filed on Dec. 18, 2003, incorporated herein by reference in its entirety, and related U.S. utility patent application Ser. No. 11/015,382, also incorporated by reference in its entirety.

FIELD OF THE INVENTION

This application relates generally to a method for examining and/or evaluating pressure systems.

More specifically, this application relates to a method for examining and safely evaluating fluid pressure systems to aid overpressure design and/or sizing of overpressure equipment.

BACKGROUND OF THE INVENTION

Industry utilizing fluids under pressure, especially the hydrocarbon processing industry, have particularly exacting audit requirements (such as OSHA 1910.119, for example), but the current (as of the time of filing) state-of-the-art in the hydrocarbon processing industry tends toward manual paper analysis and archiving and/or antiquated legacy data-processing systems. This combination makes compliance activities very inefficient, even when attempting to meet the minimum OSHA demands.

End users attempt to rectify this situation either by developing in-house software or by contacting outside vendors for help. This can be expensive, and thus may not be economical solutions to the problem.

Further, for the most part, the users are not much better off using the above approaches because such approaches lack the highly specialized engineering and software development knowledge needed to create integrated solutions that do in fact satisfy both OSHA and end-user requirements. Accordingly, the market needs a "Web-enabled" engineering software system that satisfies, OSHA 1910.119 audit requirements for pressure relief systems.

Thus, because the hydrocarbon processing industry has particularly exacting Process Safety Management (PSM) audit requirements, but the "current state of the art" in today's hydrocarbon processing industry tends more to manual paper or antiquated legacy data-processing systems, an improved means for addressing the audit requirements would be beneficial.

In an increasingly competitive environment, software technology must support the ability of operating units to improve process plant productivity, reduce cost and risk, and enhance manufacturing uptime. A new technology for hosting a broad range of new forward thinking approaches and tools that can meet and surpass these challenges is thus desired.

SUMMARY OF THE INVENTION

Provided is an evaluation system for evaluating a process system, said process system comprising a plurality of equipment including a protection device for protecting the process system. The evaluation system comprising: a storage subsystem for storing a computerized equipment database including equipment information representing each of said plurality of equipment; a server for serving content including some portion of said equipment information, via a public communication network, to an application executing on a remotely located user computer; and an assessment subsystem for automatically determining, by utilizing said equipment information, an adequacy of the protection device for protecting the process system, and generating protection assessment information therefrom.

The protection assessment information is also stored in said equipment database or in another database by said storage subsystem, and the content served by the server includes some portion of said protection assessment information.

Also provided is a method for evaluating a process system, comprising a plurality of equipment including a protection device for protecting the process system.

The method comprising the steps of: storing equipment information representing each of said plurality of equipment in a computer database; serving content to an application executing on a user computer; automatically determining an adequacy of the protection device for protecting the process system using the stored equipment information; automatically generating protection assessment information using results from the assessment process; and storing some portion of said protection assessment information in said computer database or in another computer database.

The content includes some portion of said protection device information and some portion of said protection assessment information.

Still further provided is a method of performing a PSM assessment of a process system by using the assessment system and/or assessment method described above.

Also provided is a method of performing a PSM assessment of a process system using the above system and/or method.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 6b is a Flow Chart showing an implementation of a commercially available embodiment, iPRSM™, might be utilized for performing an evaluation;

DETAILED DESCRIPTION OF THE EXAMPLE EMBODIMENTS

Process Safety Management (PSM) is critical to process plant design and operation. Process safety management includes all aspects of plant safety control. Pressure Relief Systems Management (PRSM) is a key component of process safety management. The management and auditing of pressure relief systems compliance is necessary for the fulfillment of OSHA PSM compliance requirements and industry insurance requirements. Note that throughout this document, the invention is described as the Evaluation System (or System or iPRSM™), whereas the system to be evaluated by the Evaluation System is known as the process system or the process system to be evaluated.

Figure 4:
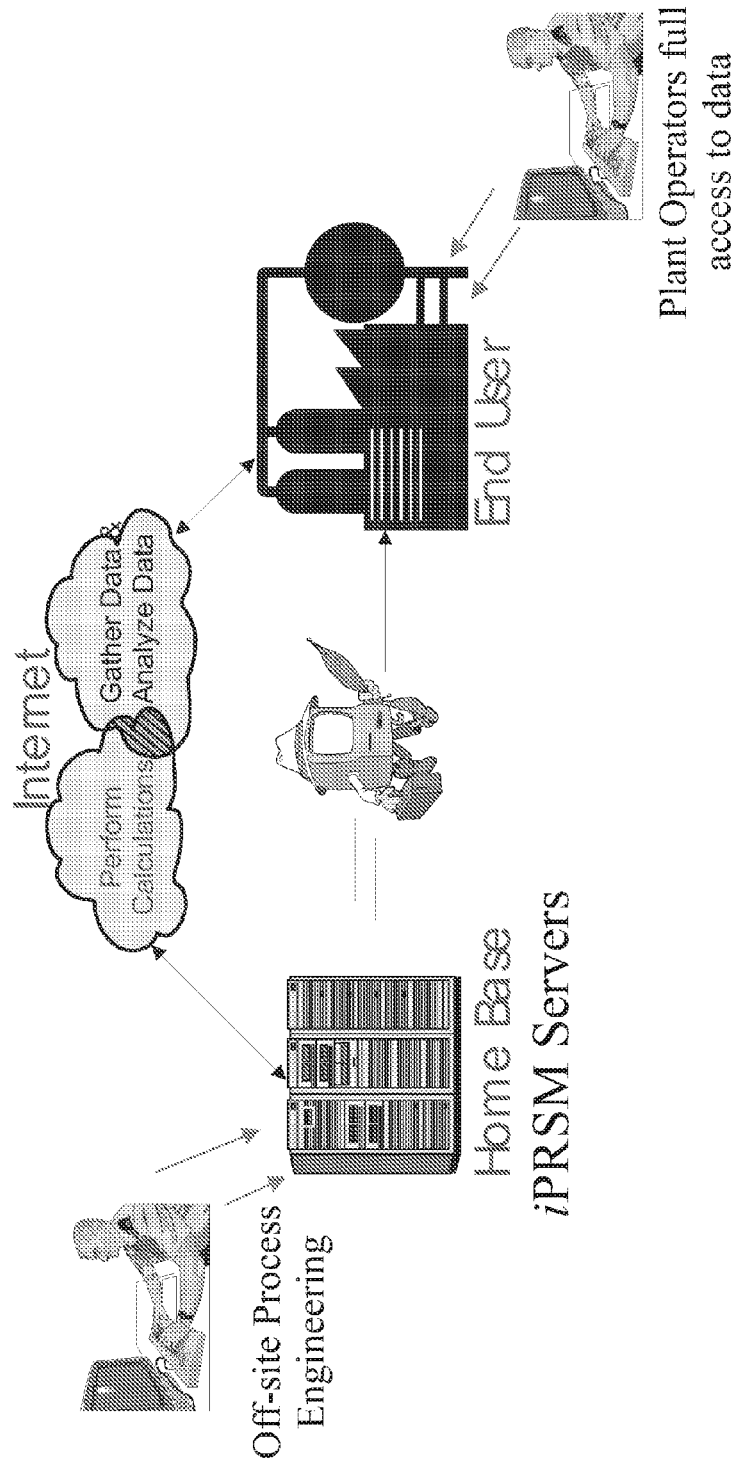
FIG. 4 is a diagram representing a possible implementation and use of the Evaluation System in a commercial embodiment, iPRSM™.

The invention is a method and/or system, including a computer program for running on a computer (hereinafter the "Evaluation System" or the "System"). The Evaluation System is a PRSM software application that can be utilized to help ensure that process plants operate under the protection of safe pressure relief systems at all times. The Evaluation System is used to evaluate and assess the safety and operation of a process system design (e.g., a process plant or subsystem thereof). In a proposed commercially available embodiment, shown in FIG. 4, the Evaluation System is to be called iPRSM™. FIG. 4 shows a top-level view of a preferred embodiment of the system in the context of its commercial use.

The Evaluation System, especially with its Web-centric technology in a preferred embodiment, allows plant personnel, auditors and engineering personnel instantaneous/concurrent access and analysis to data on any pressure relief system, from any location that has web connectivity. These personnel can quickly resolve problems from this ability, while offering the most thorough and systematic approach for the design, analysis, and documentation of new or existing pressure relief systems. From compliance to third party audits, this preferred solution offers an all-inclusive workflow and information management infrastructure that allows operating facilities to develop and maintain comprehensive models of their pressure relief and vapor disposal systems.

The Evaluation System addresses the proactive management of relief systems safety compliance according to best-practices principles, including the management of compliance-related as-operating data the ongoing verification of standards-based compliance and produces tasks for plant management reports for regulatory purposes. The net result can be safer plants and major cost savings due to the elimination of duplication of effort in plant data recording and tracking.

In its preferred embodiment, the System as implemented:
Fulfills all OSHA CFR 29 1910.119 documentation requirements;
Provides instantaneous access to real time and reliable data;
Evaluates any pressure relief device—valves, rupture disks, conversation vents, vacuum breakers, emergency vents, etc.;
Includes all hydraulic piping calculations;
Includes engineering and catalog data for all major PRV manufacturers;
Is integrated to a comprehensive thermo-physical property package;
Import/Export capabilities to any platform
Assists the practical needs of plant operators and application engineers; and
Provides a reduction in cost/time/risk for management pressure relief design systems.

In its preferred embodiment, the Evaluation System allows centralized instant access, analysis and management to live data, at multiple locations, from anywhere in the world. It uses the web standard secure transport protocols (SSL encryptions & HTTPs) as all major financial institutions and secure e-commerce sites. Combined with complete user access controls, the System assures proper transaction management for concurrent users.

The System is Platform/Hardware Independent, and utilizes an Open architecture framework which allows the System to run on virtually any platform—Linux®, Unix®, Windows® or Macintosh®, for example.

The System can be implemented in a Standalone mode, on a LAN (e.g., an intranet), or on a WAN (e.g., the Internet). It can utilize any compliant browser, and can be implemented on any server platform (e.g., Windows, Linux, and Unix).

The system can utilize any commercially available database application or standard, and any hardware that is Windows based, Linux based, or Macintosh based. Furthermore the system will preferably utilize a Multi-user Architecture.

Pressure Relief Safety Management (PRSM) is a collaborative effort which supports concurrent access and Multi-tasking functions. It provides Access Control—who gets to do or see what.

The System is intended to be a tool for support of "Management of Change". Management of Change (MOC) is an activity to document modifications to a process, such as changes in plant equipment and/or design, for example. In most cases, it also refers to the actual document that is used to initiate a change. The Evaluation System preferred solution has an explicit workflow model that automatically provides an ideal "management of change" protocol. The System's MOC is used to initiate all modifications and becomes part of a documented workflow process, which defines the reason for the change, approvals and reviews, schedule or priority, and completion verification. This includes a comprehensive "signoff model" where all changes are digitally signed and recorded. It includes a stand-alone repository for equipment records, queue for management of changes and PHA follow-ups.

The System provides Data Import/Export Capability, which can link to any relational database by plug and play; spreadsheet templates can also be used to import/export data. It is designed to support collaborative work.

Furthermore, the preferred System supports remote auditing of plants by OSHA inspectors. The multi-user interface and web-based system allows multiple users to access information using full or read only access levels. This allows remote audit capability by inspectors or review and collaboration by colleagues.

The System also provides a "Centralized Document Repository" that can be stored in electronic format. In order to properly manage a plant's pressure relief system, engineers need to have access to a wide variety of information about all aspects of the plant itself. As complete a "paper trail" as possible should to be captured in digital format and stored as a component of the pressure relief systems management process. This information can then be provided to system users in both graphical and textual form.

Information tracking and archiving requirements are typically the same for both new and existing installations. The preferred System can support starting with a new installation and keeping complete records from the beginning than to track down or reconstruct this information after the fact. The System document repository will also allow the user to digitize legacy paper data and store the digitized data its corresponding equipment.

To properly manage a plant's Pressure Relief Systems and to ensure the validity of the audit process, the preferred System can capture, track and document all changes that are made to the plant.

The System preferably will capture and record, for example:
 design data;
 as-built data;
 equipment data;
 maintenance data;
 inspection data; and
 historic data.

The preferred System is designed to provide needed "Industry Documents" as required by ASME, API, OSHA, EPA, etc. "Site Reference Documents", including Physical Properties Database, Relief Safety Manuals, etc. will also be supported. Software Documents, such as an interactive user manual, for example, are also provided to aid the user of the preferred System.

The preferred System will also provide "Groupware Tools", which are important for administration and project management. Meetings, deadlines, and milestones which need to be available to broader community are supported.

Further supported by the preferred System are Internal Email Functions for keeping email and notes are part of groupware, useful to keep a historical perspective.

An "Internal Task Queue Manager" can also be provided with a single interface to manage all work on all tasks with other users from within the same program.

An Integration to "Flash Calculation Engine" and "Thermo Physical Properties System" is preferably provided. The preferred System has integrated the VMGThermo thermo physical property system from Virtual Materials Group, Inc., providing a leading position in thermo physical properties. Although the assumption of steady-state conditions proves adequate for most pressure relief system evaluations, the comprehensive flash calculation engine and mixture physical properties also allow accurate and creative solutions involving thermodynamics. The preferred System can also be integrated with any physical properties database via a spreadsheet interface approach.

The System also provides an "Architectural Model" which preferably ensures that all the pieces of equipment in all the protected systems are appropriate for their application, in light of all the failure scenarios including overpressure contingency scenarios that have been attributed for each of the protected systems in a plant.

Furthermore, the System user interface uses a hierarchy approach with these main components: "Plants", "Units", "Protected Systems", "Equipment", and "Overpressure Contingency Scenarios".

Plants are comprised of units and equipment assigned to units. Equipment provides protection, requires protection, both, or neither; and Equipment has fittings: inlet/outlet. Units are comprised of protected systems. Protected Systems are comprised of linked pieces of equipment, with system sketches portraying the protected systems. And Overpressure Contingencies are assigned to protected systems, and describe potential scenarios of concern to be evaluated by the System. Calculation Parameters are linked to specific equipment attributes, and "Associated Documents" are linked to equipment.

The System provides a "Protected System Model" which preferably ensures that all the pieces of equipment in all the protected systems are appropriate for their application. All the overpressure contingency scenarios that have been attributed for each of the protected systems in a plant are calculated and documented.

The preferred System also supports an "Equipment Abstraction Model" for supporting an arbitrary number of equipment types. The basic idea is that any kind of equipment can be linked to a protected system in one of four roles: protected, protecting, overpressure source, or ancillary.

A "Causes of Overpressure Abstraction Model" is also provided in the preferred embodiment, which includes all API "causes of overpressure scenarios" included as failure scenarios. The scenarios are deemed applicable or not, and will indicate which ones have been considered in the final relief study. There are many events which may cause the internal pressures to rise above mechanical design limits of a processing unit. The one common aspect of relief occurrences is that something has caused the balance of mass and energy entering and leaving a system to be disturbed to the point where the imbalance cannot be absorbed without the pressure rising above mechanical limits.

The preferred System will also support a "Maintenance Database" having maintenance records linked directly to equipment records.

The preferred System will further support an "Automated Workflow Model", which is an explicit workflow model which automatically manages the steps the user needs to follow to get the job done. This includes keeping track of who and when took each step (by person login id, for example).

The preferred System also support navigation through P&ID's or System Sketches, whereby a user can navigate to any piece of equipment (which has all associated calculations & documentation) by simply calling up a P&ID image and make a selection with the click of a mouse. Unit drawings and system sketches are directly linked to pieces of equipment.

A "Signoff Model" is a workflow model which includes signoff steps at each and records changes and signoffs as they are made. A "Permissions Model" protects data access and workflow steps and can be controlled by per-user access levels. "Revision Control" provides a History that is automatically managed and archived, with all changes electronically signed to record the user revisions. Closing the revision prohibiting any changes until a new revision is opened locks versions of protected system evaluations. Revision Control is controlled by access restriction to super users.

"Worksheets and Units" maintains computational integrity of the standards-base calculations and units. "Dependency Links" are used to link pieces of information not covered in the standards and workflow that influence decisions but that are not explicitly identified, and provide links to associated documents.

The preferred System supports various "Engineering Functions" as well. "Sizing for Pressure Relief Valves" includes sizing for conventional, bellows, and pilot operated relief valves, and includes ASME Sec I, III, VIII, and Non-Code, and supports Vapors, Gases, Steam, Liquid, 2phase The preferred System supports "On-Line Relief Valve Selection" which provides an on-line automated relief valve model configurator. This on-line configurator will simplify the selection process by selecting the optimum PRV for most ASME code or non-code applications. The preferred System will deliver the basic valve series, orifice, construction, materials (based on temperature and pressure), and inlet/outlet valve configuration. All selections have been generated to ensure all ASME, API and generally good engineering practices have been adhered to.

The preferred System also supports "Sizing for Rupture Disks" which includes all rupture disk devices, and includes rupture disk and holders. "On-Line Rupture Disk Selection" provides an on-line automated rupture model configurator. This on-line configurator will simplify the selection process by selecting the optimum PRV for most ASME code or non-code applications. The System will preferably deliver the basic disk type, size, material, disk holder, and maximum ratings. All selections have been generated to ensure all ASME, API and generally good engineering practices have been adhered to.

The preferred System also supports "Sizing for Atmospheric Conservation Vents", which includes pressure and vacuum vents, and pallet-weight and pilot operated vent breathers. "On-Line Conservation Vent Selection" is also supported, which provides an on-line automated conservation vent model configurator. This on-line configurator will simplify the selection process by selecting the optimum PRV for most ASME code or non-code applications. The System will deliver the basic valve series, orifice, construction, materials (based on temperature and pressure), and inlet/outlet valve configuration. All selections have been generated to ensure all ASME, API and generally good engineering practices have been adhered to.

The preferred System supports "Determination of Relief Requirements", which are conditions for which overpressure protection may be required for pressure vessels and low pressure storage tanks. The System also supports "Relief Load Calculations" which are systematic identification of all potential overpressure scenarios and relief load calculations are determined and associated with each piece of equipment. Specific equipment operating and design attributes or parameters are linked directly to relief scenario calculations ensuring ease of identification of impacts of operation, design, or hardware changes to ensure continuous overpressure protection adequacy.

Further supported are "Fire Vapor Generation" providing relief capacity due to effect of fire of the wetted surface of a liquid filled vessel; "Fire Gas Expansion", providing relief capacity due to effect of fire of the wetted surface of a gas filled vessel; and "Tube Rupture" (Heat Exchanger) providing capacity determination of a high pressure (tube rupture) stream over pressuring equipment on the low-pressure side of a heat exchanger; "Control Valve" providing capacity determination of an automatic control valve failure; "Pump Head Calculations" for determine pump head (capacity) calculation; and "Thermal Expansion" providing liquid/thermal expansion calculations Preferably, Inlet/Outlet Pipe Loss calculations are supported by providing a comprehensive library of inlet and outlet pipe fittings and contains parameters that identify the size and equivalent lengths or K coefficients. These are then used for computing the pressure profile for each section of piping. Force and moment calculations, Acoustical Induction Vibration calculations, and Noise level calculations are all supported. "All Overpressure Scenario Area Calculations" provide required area calculations (per individual OVP scenario) based on ASME/API requirements.

"API Omega Appendix D—2Phase Flow" provides two-phase relief calculations are based upon the Design Institute of Emergency Relief Systems (DIERS) methodologies. The API Omega model has been standardized in the System.

"Multiple Pressure Relief Valve Applications" which are some applications in which more that one relief valve is required to satisfy the required area, is preferably supported. "Layers of Protection Analysis" (LOPA) simplified risk assessment methods are also preferably supported.

Equipment Libraries: The System preferably supports an arbitrary number of equipment (or device) types. These individual pieces of equipment can be classified as" providing protection, requiring protection, or neither. All pieces of equipment can be assigned descriptive data that physically describes model, configuration, and identification. Equipment that is classified as "protected" or "protecting" also has defined variables that provide process data.

Supported equipment Includes: Block Valves; Control Valves; Compressors; Heat Exchangers; Relief Valves; Pumps; Rupture Disks; Tank Vents; Steam Turbines; and Vessels, for example.

"Relief Valve—NB Redbook" which contains information of National Board pressure relief certification data, is supported by the System, which contains a information of National Board pressure relief certification data including manufactures such as Farris, Consolidated, Crosby and Anderson Greenwood.

A "Pipe Fitting Catalog", which contains comprehensive library of inlet and outlet pipe fittings and standard pipe schedules, can also be supported. The forces imposed by external piping often affect pressure relief devices. These forces may be due to dead loads of piping components, loads induced by thermal expansion, and loads induced by momentum forces of fluid flow. The System has a comprehensive library of inlet and outlet pipe fittings and contains parameters that identify the size and equivalent lengths or K coefficients. These are then used for computing the pressure profile for each section of piping.

The preferred System provides a number of "Deliverables" that meet OSHA 29 CFR 1910.119 documentation guidelines. Equipment databases including all relevant parameters are created. The "Repository includes all digital documents, including: P&ID documentation; ISO piping drawings; CAD drawings of all relief devices inlet/outlet piping; CAD drawings of all flare header systems; and Original equipment datasheets, calculations, certifications.

Additional deliverables/results preferably include: Identification of all relief contingencies for all devices; quantification of required relief rates; orifice area calculations for all relief devices; inlet/outlet piping loss calculations for all devices; mechanical evaluation of applicable devices (noise level, reaction forces, acoustical vibration analysis); complete documentation package including all calculations, drawings, spec sheets, etc.; automatic updating of files according to changes in codes; accessibility and standardization of enterprise wide users; and a wide variety of HTML reports, all for aiding in the assessment of the process system being evaluated, and to aid auditing and review processes.

Figure 1:
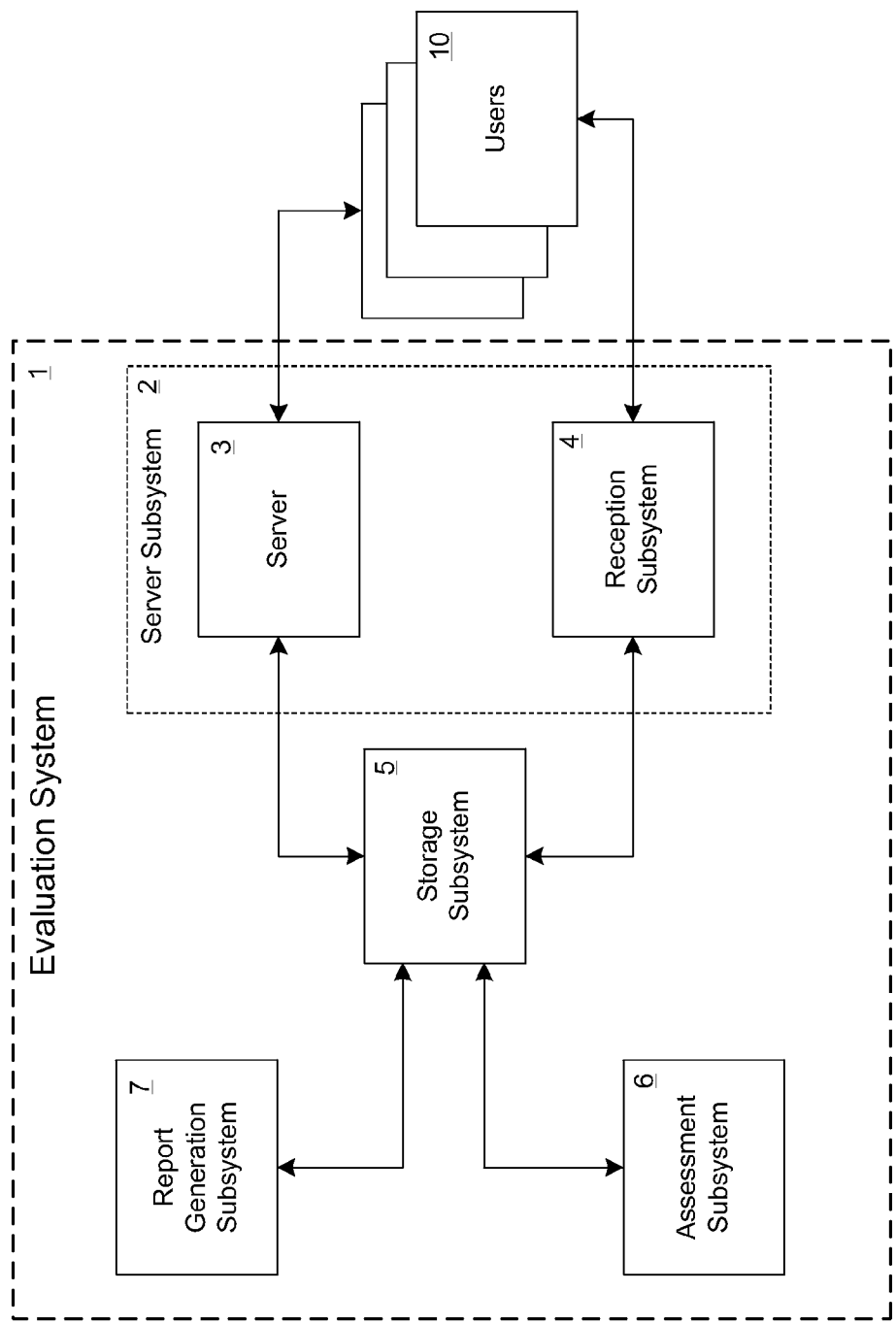
FIG. 1 shows a block diagram representing the Evaluation System.

Evaluation System Architecture:

FIG. 1 is a block diagram showing a simplified view of the Evaluation System 1 in the context of its use environment. In an abstract, generalized description, the System 1 is comprised of a server subsystem 2, which can be implemented, for example, by including a server 3 and a reception subsystem 4, although the server 3 and reception subsystem 4 may be combined into a single server application (running on a single computer, for example), as another example.

The Evaluation System 1 also comprises a storage subsystem 5 for storing data and equipment information described in more detail, both above and below. The storage subsystem can utilize any of a number of computer database applications (e.g., SQL, objected oriented databases, etc.) and storage devices (e.g., RAM, ROM, hard drives, CD ROMs, DVD, etc.)

The equipment information includes diverse information about various process equipment of the process system being assessed. Equipment drawings, maintenance information, manuals, relationships to other equipment, location, etc., examples of which are discussed throughout this disclosure, can all be included in the database(s).

The Evaluation System further comprises an assessment subsystem 6 for performing evaluations of the process system being examined. The assessment subsystem has the computer application code and hardware necessary to evaluate the process system being examined using the equipment information in light of various failure scenarios (many of which may be known for any given type of equipment).

The assessment subsystem will utilize some portion of the equipment database to perform the evaluation/assessment. Obviously, some information relating to the protection equipment being evaluated must be utilized. Furthermore, information about the equipment or subsystems being protected by the protection equipment being evaluated will also likely be utilized in the assessment. However, there may be portions of the process system being evaluated that are not relevant to the particular scenario or equipment being assessed (e.g., too remote, isolated, or no impact), and data related to that irrelevant portion may be ignored.

The Evaluation System 1 may further comprise a report generating subsystem 7 for generating reports useful in evaluating the process system, for performing audits, and for capturing the assessment results.

The Evaluation System 1 interacts with one or more users 10 via the server subsystem 2, which can include a server 3 and a reception subsystem 4. Via the server subsystem 2, the users 10 can receive data and information from the System 1 through the server 3, and provide data and information to the System 1 through the reception subsystem 4.

For example, the sever subsystem 2 may be implemented using a commercially available web server, which can be used to both send (i.e., serve) and receive information from a user. Thus, a single commercial application could be used to implement the server subsystem 2. However, for more complex operations, the various subsystems could be distributed across a number of computers, each running one or more applications to support the allocated subsystem.

Similarly, the report generation subsystem 7 and/or the assessment subsystem 6 could be distributed across multiple computers, implemented on the same computer, or combined with the storage subsystem 5 and server subsystem 2 on a single computer. The software of the Computer Program Listing Appendix in the related application contains examples of code for implementing the System, including the report generation subsystem 7 and the assessment subsystem 6.

The storage subsystem 5 can utilize a custom or commercially available database application running on one or more dedicated, or shared, computers. The data can be stored on any of a number of storage device, including disc arrays, disc drives, RAM, ROM, CD ROMs, DVD ROMs, tape, or any other medium appropriate for electronic data storage.

Figure 2:
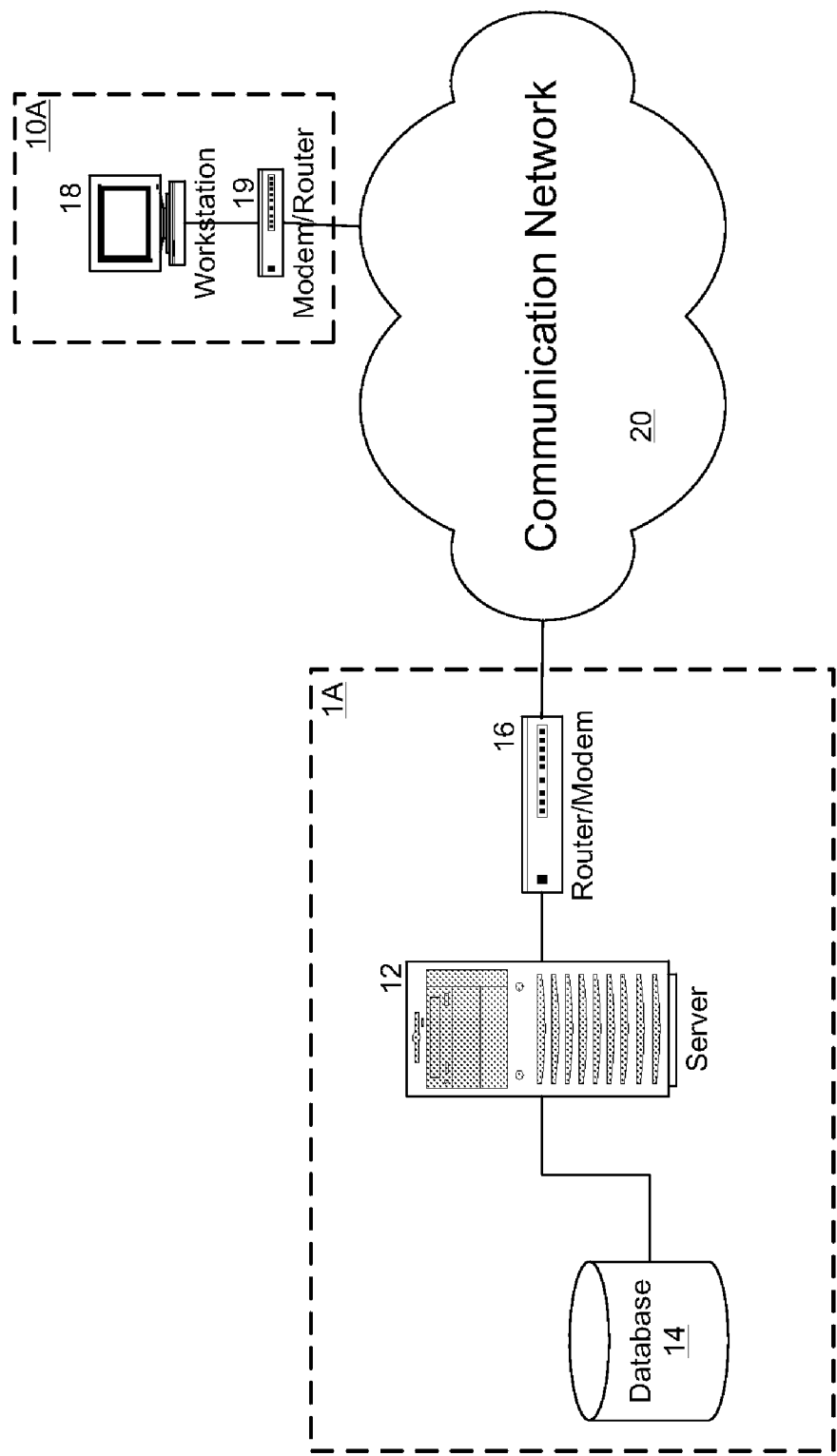
FIG. 2 is a schematic showing a simple embodiment of the Evaluation System.

FIG. 2 shows an example implementation 1A of the Evaluation System 1, in one of its simplest forms. The system 1A comprises a server 12, a database 14, and a router/modem 16 to connect to a public communications network 20. A user 10A, utilizing a workstation 18, is also connected to the communications network via a router/modem 19, for example. In this implementation, the server 12, along with the database 14 and router/modem 16 and the appropriate software, implement all of the subsystem functions of the System 1 by running various application programs on the server 12 hardware, for example. Of course, the system 1A may also support additional users in a manner similar to that shown for user 10A, for example.

The preferred embodiment can utilize the Internet as the public communications network. However, other communications networks could be utilized, such as telephone networks, cellular networks, dedicated networks, cable TV networks, power lines, etc. Because of the ubiquitous nature of the Internet, a solution utilizing that diverse network (which can utilize many individual communications networks) is most appropriate at this time.

Figure 3:
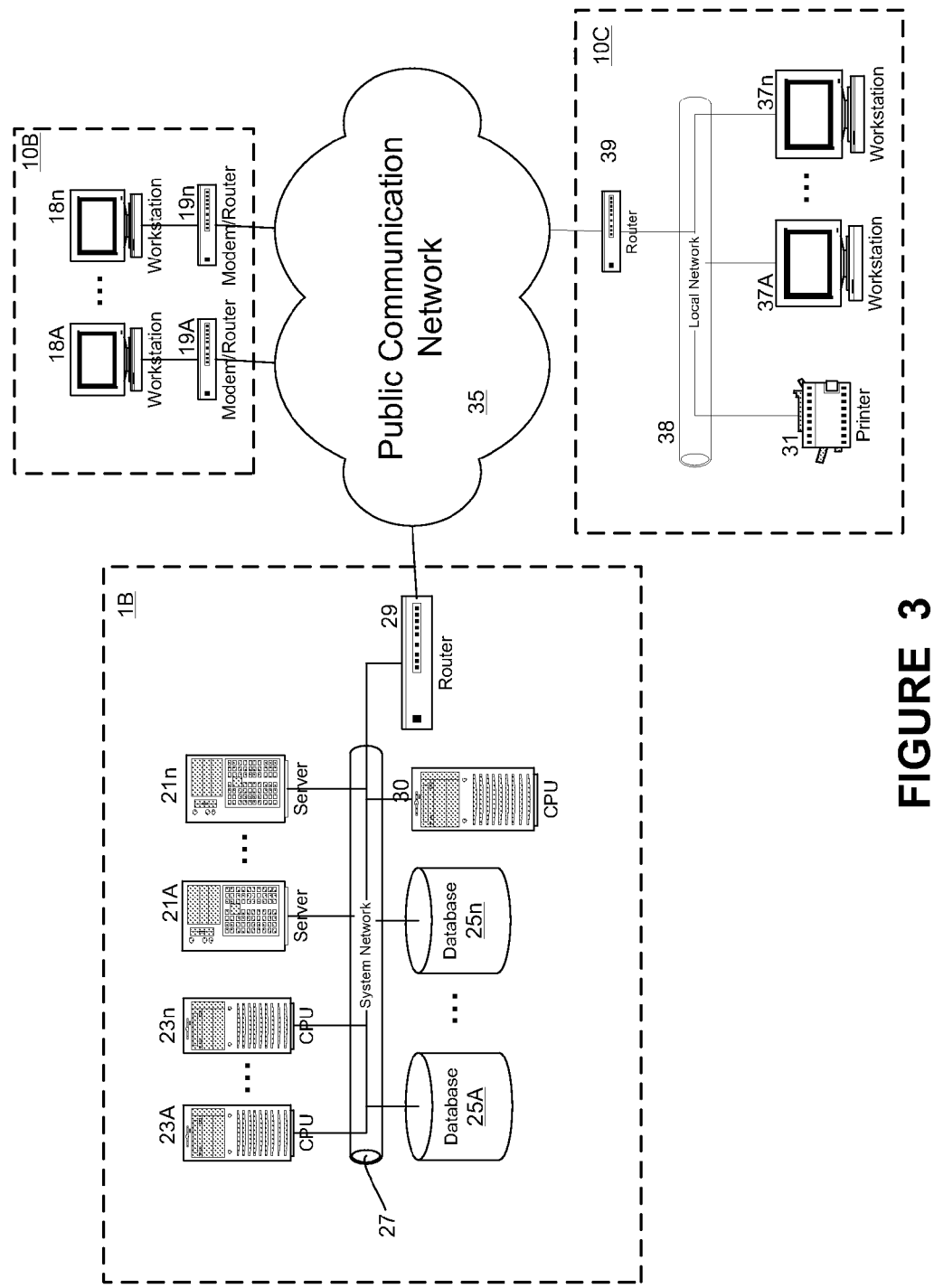
FIG. 3 is another schematic showing a more complex embodiment of the Evaluation System.

FIG. 3 shows a more complex implementation 1B of the system 1. In this system 1B, a plurality of servers 21A-21n can be utilized to implement the server subsystem 2 functions of FIG. 1. Further, a plurality of CPUs 23A-23n can be utilized to implement the assessment subsystem 6 functions of FIG. 1. A plurality of database storage devices 25A-25n can be used to implement the storage subsystem 5 functions of FIG. 1. And a CPU 30 and printer 31 can be used to implement the report generation subsystem 7 functions of FIG. 1, for example. Finally, a router 29 can be used to connect to a Public Communications Network 35 (such as the Internet, for example).

Note that, although FIG. 3 shows multiple servers 21, CPUs 23, and databases 25, any of these might be implemented on one or more computers in various configurations, as desired. As the number of users supported by the system 1C grows, additional hardware can be added to increase the capacity of the system.

Continuing to use FIG. 3 showing the more complex implementation 1B, a plurality of users can be supported in various configurations. For example, a plurality of users 10B operating single workstations 18A-18n, individually connected to the public communications network 35, can be supported. Furthermore, complex user networks can also be supported, as represented by the example shown in 10C. Of course, the Evaluation System of FIG. 1 might also be utilized to support users in the manner of 10B and 10C, as well.

Figure 5:
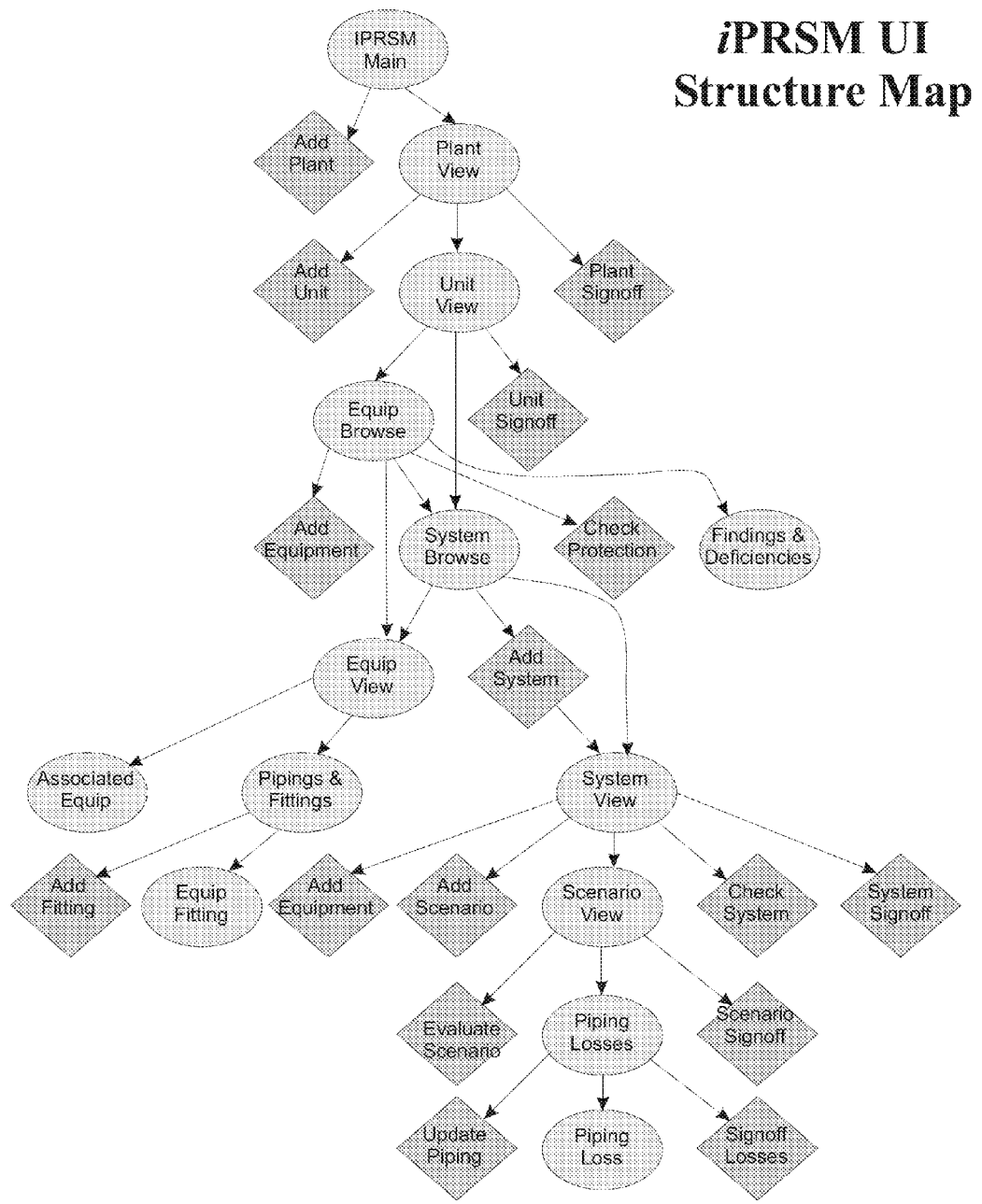
FIG. 5 is a structure map showing a structure of a commercial embodiment of the Evaluation System, iPRSM™.

FIG. 5 shows a structure map of the software design of a commercially contemplated version of the Evaluation System known as iPRSM™. This structure map represents the software contained in the Computer Program Listing Appendix in the related application, incorporated herein by reference.

For supporting multiple users, the Evaluation System will serve and receive information related to those users according to the interest and/or access rights of the individual user. Thus, different users may wish to view and/or evaluate different parts of the process system being evaluated. However, as equipment information is updated, any user wishing to view that information will then receive the updated information. Furthermore, assessment results and/or reports generated by one user may be viewable by another user. The different users may well be remotely located from each other.

It is clear that the implementations shown in FIGS. 2 and 3 are merely representative of two example system designs. There are numerous other possible hardware implementations of the system functionality that fall within the scope of the invention and the claims.

The Evaluation System is preferably implemented as a web-based application available over the Internet, using various scripting or dedicated applications to provide added benefit (including assessment capability, for example). The Evaluation System can preferably utilize a commercially available web browser to connect to a database over a LAN or Internet connection. In many ways it acts like most web sites, with web pages that can be opened with hyperlinks ("links") to additional web pages.

The pages that are viewed are composed of data that resides in one or more database storage devices, and is prepared for the user each time the user visits a page. There are special links that perform various operations with that data, which may display a new page, or refresh the view of a current page.

The Evaluation System served data can preferably be used by any industry standards-compliant browser in default configuration having JavaScript, cookies, and popup windows enabled.

The Evaluation System preferably uses JavaScript for its controls, and the Evaluation System uses a temporary cookie to manage user interactions throughout the application. This cookie is not retained when the user closes a browser. The Evaluation System also uses pop-up windows for its transactions with the database, and for various small pages. Any "ad-blocking" software that traps pop-up windows should be disabled for proper operation.

A LAN/Internet connection, preferably a broadband-quality connection, is recommended. Third-party plug-ins may be utilized along with the web browser. Examples of such plug-ins are Microsoft Word, Excel, and Adobe Acrobat.

The Evaluation System in a preferred embodiment can be used to manage sensitive data that should adhere to strict standards for correctness and completeness. It is designed to safely and securely use a public medium: web pages over the Internet or over a LAN. To deliver a secured database system over a public medium the Evaluation System utilizes best practices security features, including Login access, requiring a Login Id and Password distributed by a system Administrator. Without a valid ID and password, visitors to the Evaluation System will be able to view only the Login page and several purely informational pages.

Figure 6A:
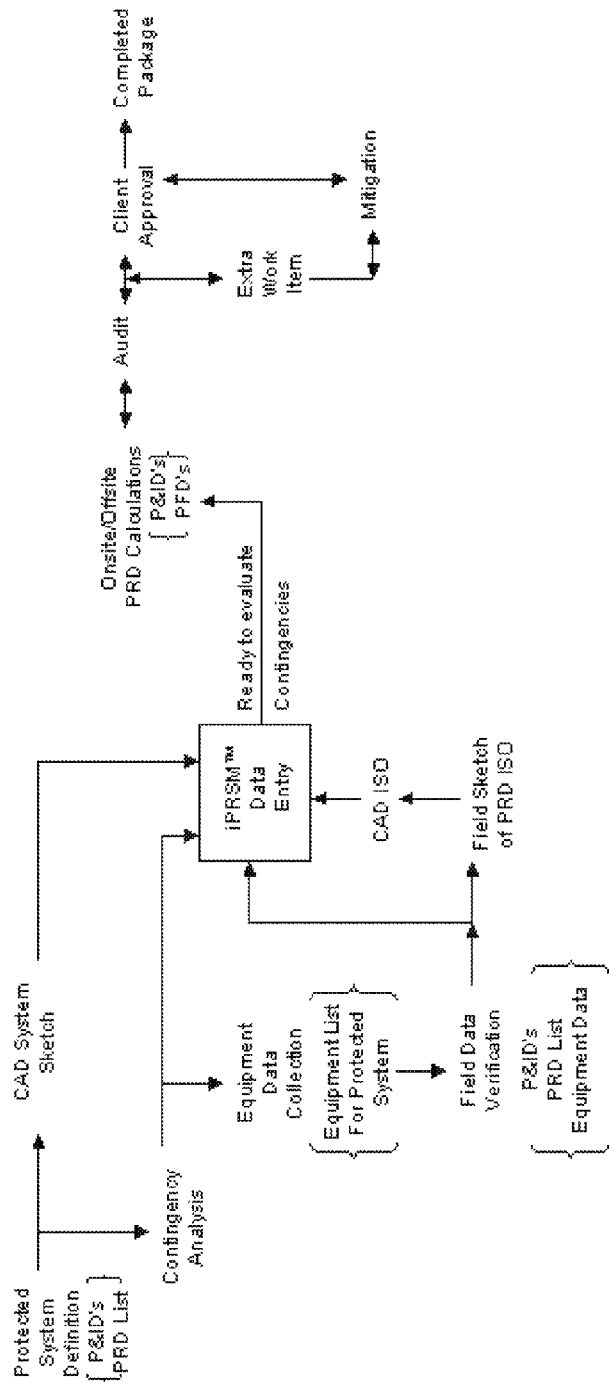
FIG. 6a is a work flow diagram for a Relief Valve project as a commercially available embodiment of the iPRSM™ system might be used.

FIGS. 6a and 6b are representations of the use of the Evaluation System to evaluate a process system. FIG. 6a shows a workflow for such an evaluation process. FIG. 6b is a flow chart describing the evaluation process in more detail. Note that at some point, all of the necessary equipment information describing the process system must be properly entered into the Evaluation System database. Equipment lists and tool sets provided by the System support this task, although customized equipment can also be entered.

Figure 7:
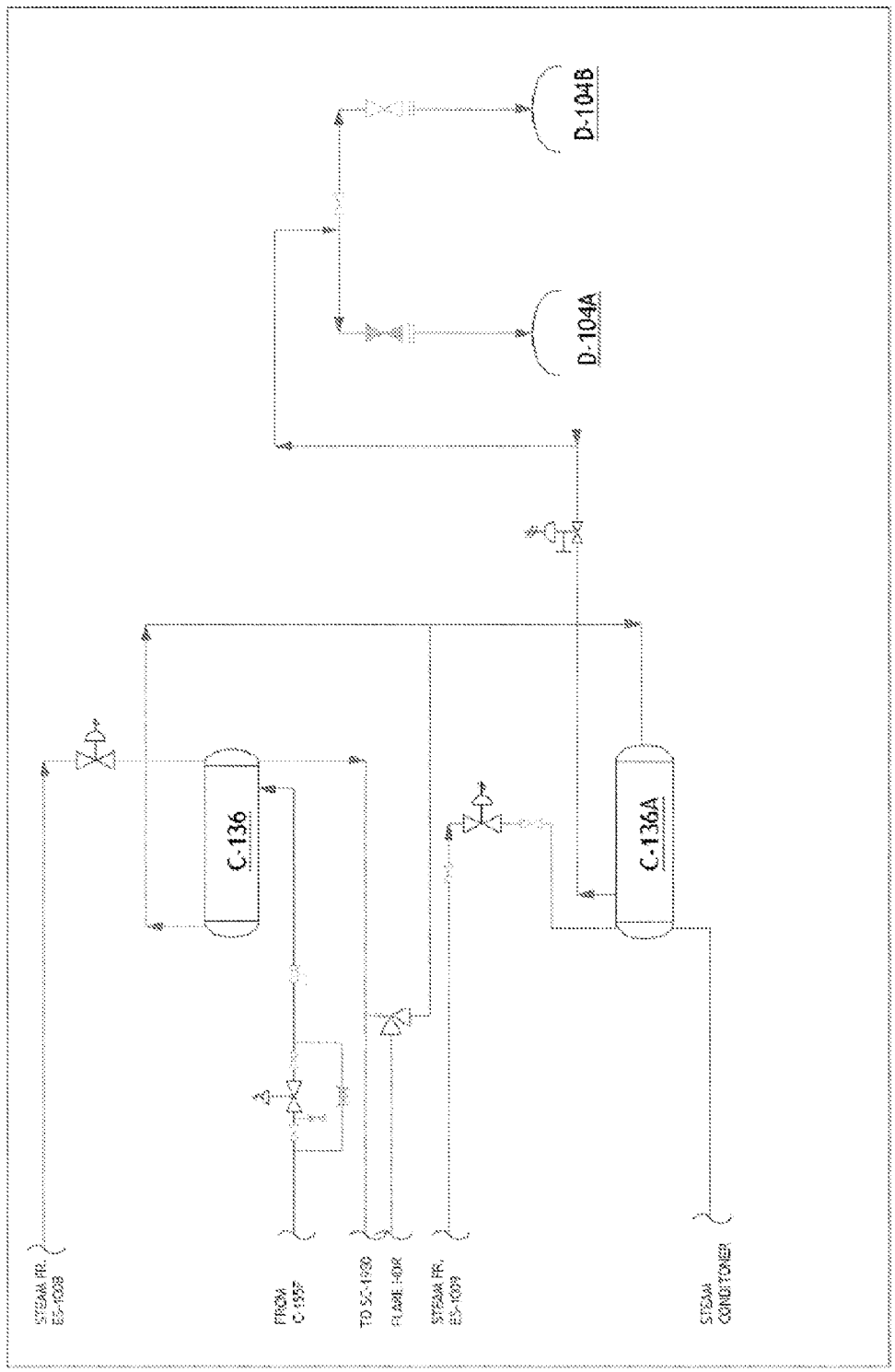
FIG. 7 is a screen shot of a commercially available embodiment, iPRSM™, showing a schematic of a process system being evaluated.

FIG. 7 shows a screen shot of a schematic diagram of part of an example process system to be evaluated by the Evaluation System.

The Evaluation System includes an equipment database and a scenarios database, allowing an engineer to input process specific information to properly determine suitable overpressure relief for that process. The engineer has the option to design or evaluate a single relief (failure) scenario or multiple relief scenarios based on the specifics of that particular process. From a design standpoint, the engineer must input equipment information and scenario information pertaining to the pieces of equipment in the process, the process conditions, the type and number of relief devices desired, the potential causes of overpressure, and the materials involved in the process. Once entered, the data enables the System to determine the proper communication between data within the database to perform the appropriate calculations to determine the size of the relief system (and/or devices) needed to protect against overpressure from the potential causes thereof.

From an evaluation, or auditing standpoint, the Evaluation System supports evaluating current pressure relief systems to ensure that changes, made or proposed, to the process have not exceeded the current relief capacity of the pressure relief system. In this manner, the engineer proceeds by selecting the portion of the relief system being evaluated by entering identifying numbers of the proper relief devices, and entering information pertaining to the equipment in the process, the process conditions, the potential causes of overpressure, and the materials involved in the process. The Evaluation System again uses this information to select the appropriate equations and determine a relief capacity and an area required for said capacity from the selected equations. These values can then be compared by the engineer to the equivalent values of the devices currently in place.

Lists of equipment, including relief devices, and causes of overpressure, are all input into the Evaluation System (or provided as part of an Evaluation System tool set). Pressure relief valves and rupture disks, for example, those manufactured by Curtiss-Wright Flow Control Corporation ("Curtiss-Wright") or its predecessors, are included in a relief devices list, and each relief device in that list is linked with information pertaining to the physical properties of the relief device. Furthermore, devices produced by manufacturers other than Curtiss-Wright can also be engineered and evaluated using the Evaluation System by inputting a manufacturer specific identification code for the appropriate pressure relief device in the relief devices list, and entering the appropriate parameters and descriptions, if necessary.

The causes of overpressure list in the Evaluation System includes causes of overpressure that are known to commonly occur in a processing facility, and aid in determining the failure scenarios and their results. Engineers using the Evaluation System are presented with the option of selecting from an Evaluation System database the causes that may potentially occur in a particular process. Once the causes of overpressure are selected, the Evaluation System can initiate communication between the causes of overpressure list and the equipment list to calculate the expected relief load capacity. From this expected relief load capacity, the Evaluation System can properly determine the size of the overpressure relief devices necessary to safely protect against equipment failure due to over pressurization.

The relief devices for a plant must be installed in a process with sufficient inlet and outlet piping capacity to safely accommodate the simultaneous overpressure of a plurality of pieces of equipment. An engineer can use the Evaluation System to determine the inlet and outlet piping necessary for the relief scenario selected. Accordingly, the Evaluation System provides the tools to allow an engineer to quickly and safely design or evaluate the relief capabilities associated with production processes.

Furthermore, the Evaluation System preferably utilizes an object-oriented database structure.

The goal of Pressure Relief Systems Management is to ensure that plants are operating under the protection of safe pressure relief systems at all times. The key to achieving this goal is the proactive management of relief systems safety compliance according to best-practices principles, including the management of compliance-related as-operating data and the ongoing verification of standards-based compliance.

A successful PRSM process according to the invention produces tasks for plant management, reports for regulatory purposes, and safer plants. To ensure that a plant remains compliant over time, the Evaluation System can aid in:

conducting periodic relief systems audits;
submitting audit reports at appropriate intervals;
correcting instances of non-compliance identified by audits; and performing "what-if" evaluations that compare the current audit with hypothetical audits performed using newer or older versions of the calculation worksheets.

Those who participate in proactive PRSM processes using the System can faithfully implement the engineering standards that the engineer utilizes on for the determination of compliance. The System should support the participants collaborative opportunities and respect their workflow management needs. It must also implement best practices from software engineering, especially in the areas of security and multi-user database access protocols. The Evaluation System can provide this support for PRSM. The preferable aspects of the Evaluation System are:

Standards Compliance: the Evaluation System preferably uses ASME and API standards-based evaluation of possible overpressure contingencies. Hazard analysis is equipment-based, rather than relief-device-based, to ensure that all equipment is properly protected.

Calculation Worksheets: the Evaluation System can contain a complete set of ASME/API standards-based engineering worksheets for accurate consistent calculation of relief flow rates, orifice areas, inlet/outlet piping losses. Installations that are inconsistent with industry standards and codes can be flagged and identified. Calculation worksheets are under version control, and every evaluation is recorded with respect to the version of the worksheet used to perform the evaluation.

Traceability: the Evaluation System aids the user to establishing dependency links between the parameters used to perform a hazard analysis on a piece of equipment and other worksheets and equipment characteristics that were used to determine those parameters. This means that decisions can then be traced back to their assumptions. If an assumption changes, then analyses based on these assumptions are flagged by the Evaluation System as needing to be re-examined for protection implications. Other system features include:

Import/Export Data can be imported/exported between the Evaluation System and other tools, such as flare header design tools, or inspection and maintenance data systems.

Standards Tracking: the Evaluation System maintains historical versions of standards calculation worksheets. When a standard changes, the impact of the proposed changes can be evaluated relative to the current hazard analysis.

Evergreen Data Management: the Evaluation System enables consolidated evergreen data management to maintain a current picture of operations in order to minimize hazards and re-evaluation errors and costs.

Workflow Support can be provided for:
Allowing selection of reasonable tasks;
Preventing selection of unreasonable tasks; and
Recording signoffs for appropriate tasks.
History Tracking and Archiving can be provided for:
Recording changes and signoffs as they are made;
Users can make queries such as who changed and who approved what, when, and why;
Reporting for summarizing changes over specified time periods; and
Maintaining Prior versions of data for review and change comparison.
Evaluation System Collaboration can be:
designed to support collaborative work;
support concurrent access by multiple users over a network;
support multi-tasking of a user's activities;
provide generic groupware tools such as task queues, discussion groups, and mailing lists; and
can interface to other software tools.

As discussed in detail above, the Evaluation System is designed for multi-user web-based access using standard commodity browsers. This means that the Evaluation System can be used from any workstation with a standard browser without requiring the installation of any additional client software. The Evaluation System including its associated database can reside on a distinct server.

Control of access to pages, workflow, and database records can be controlled according to the privileges of the logged-in user. Because the preferred http protocol is connectionless, the Evaluation System can provide full support for server-side session and page instance data, with a secure login and session management scheme. To support multiple concurrent transactions, the Evaluation System can also provide automatic enforcement of end-to-end optimistic locking. This can be used to prevent concurrent users from taking action based on obsolete data, such as generating a report while other engineers are altering equipment data.

Because the Evaluation System's web applications are preferably transaction based, they can be made to fail safely. The Evaluation System can use a structured exception handling mechanism which ensures that if anything goes wrong during the processing of a transaction: (1) no changes are made to the database, and (2) the user is informed of the failure, and the failure is logged (along with relevant debugging information). From the perspective of the Evaluation System, it is better to fail correctly than to proceed wrongly. The Evaluation System can help minimizes technology risks by not relying on uncommon technology or technology that can be changed on a vendor's whim.

The Evaluation System can be used to help minimize the above identified risks as follows:

Evaluation System programs can be made to work with any standards-compliant web browser, such as Netscape Navigator, and Microsoft Internet Explorer, for example. Internet Explorer issued as the Evaluation System's principal test browser.

Evaluation System programs can be made to work with any CGI-compliant web server, in particular Microsoft IIS and Apache, for example. Apache is available on all Microsoft and Unix-like back ends and is one of the top web servers in use.

The Evaluation System includes its own database management system (DBMS), with full support for atomic transactions and referential integrity. Testing has shown that the Evaluation System DBMS is faster than an outboard DBMS for databases of the size required by a typical application. Alternatively, the Evaluation System can utilize any of the common DBMSs for its back-end database functions, including Postgres, Oracle, and DB2, as required, for example.

The Evaluation System also preferably has a real-time distributed transaction logging facility, which allows multiple (geographically dispersed) machines to keep hot-backup copies of the production database. In the event that the primary service disappears, the site administrator can simply point the domain name service to the next-level backup machine, and the Evaluation System will pick up from the point of the last successfully completed transaction.

The system was designed from the ground up with a best-practices evolvable architectural structure, and to provide an optimal set of deployment options to the application customer according to their budget and infrastructure needs. The following models are preferably implemented:

Plants & Units model: Equipment and protected systems are organized into a plants and units hierarchy. When there is a large amount of equipment involved, some sort of organization for access is beneficial.

Protected system model: The basic concept is that any kind of equipment can be linked to a protected system in one of four roles:
   protected,
   protecting,
   overpressure source, or
   ancillary The protected systems also have per-system data.

Multiple Valves model: The protected system model preferably explicitly handles multiple valves.

Equipment abstraction model: the Evaluation System can support an arbitrary number of equipment types, including Protecting Equipment and Protected Equipment, for example.

Cause of Overpressure abstraction model: the Evaluation System can support an arbitrary number of overpressure types, each of which has its own flowchart.

Document database: A document database is preferably provided, wherein documents can link to plants, units, equipment, systems, and causes of overpressure.

Maintenance database: A maintenance database that links to equipment is preferably provided.

Workflow model: An explicit workflow model is preferably implemented that automatically manages the steps the user needs to follow to get the job done. This includes keeping track of who took each step (by person login id) and when.

Signoff model: The workflow model preferably includes signoff steps, and can keep track of who did each signoff and when.

Version Control model: A revisions database is preferably provided, linked to protected systems, for tracking versions of equipment, protected system, and causes of overpressure signoff.

Permissions model: Data access and workflow steps can be controlled by per-user access levels.

Worksheets and Units: Units handling is preferably provided. Engineering values know their units category and style, so any variable in valid style (such as inches, feet, or meters, and pounds or kilograms), can be looked, at but the underlying calculations are preferably always done in what engineers call "basis units", which is technically required by the standards.

Multi-user Concurrent Consistency is provided.

An Architectural model is provided including:
   A Protected system model;
   A Equipment abstraction model;
   A Cause of Overpressure abstraction model;
   A Document database;
   A Maintenance database;
   An Automated Workflow model;
   A Signoff model;
   A Version Control model;
   A Permissions model;
   Worksheets and Units;
   An Engineering Worksheet Model, versions maintained
      (The worksheets, links, and workflow supports the overall process of PRD safety auditing;
   Dependency links (all units, protected systems, equipment, calculations, documents);
   Unique "workflow architecture"—Controls evaluation of worksheets;
   A "State change" model—business object poster records last person who changed record and when, changes force object into state open;
   An Automated Inlet/Outlet loss calculations Workflow Management; and
   Multi-user/Concurrent Web access control.

Object Models: the Evaluation System provides a user interface for the manipulation of data relating to plants and the devices they contain, and for management of the workflow related to relief device compliance auditing. The data is structured according to a set of persistent classes, instances of which are stored in the database. The persistent objects are related according to the following schematic, which is described below.

PSM maintains data on one or more plants, such as a Greenwood Upstream plant or a Site #4 plant, for example. Each plant contains one or more processes, such as an Acetic Acid process and a Cellulose Fibre process, for example. Each process contains one or more protected systems, such as a Glycol Heater protected system and a Vapor Scrubber protected system, for example. Each protected system contains one or more devices, such as a Heat Exchanger and a Relief Valve (in a particular order), for example. In the field data previously studied, protected systems usually have an iso-piping drawing.

Each device typically belongs to one or more protected systems. For example, a heat exchanger can belong to separate input and output protected systems. Each device is of a particular type, such as compressor, pump, vessel, block valve, control valve, relief valve, heat exchanger, etc., for example. The device type determines the values that are associated with each device, either via user input or via connection to an upstream device, for example. The device type also determines the worksheet calculations and rules that are used to attempt to certify a device pursuant to compliance auditing (such as how to compute the required orifice area for a relief valve from the device operating values, for example).

Each protected system can have one or more hazard analysis scenarios, such as Cleaning and Fire, for example. Each scenario can have one or more hazard cases, such as Blocked Flow or Fire Vapor Generation, for example. Each type of hazard case determines the worksheet calculations and rules that are used to compute the derived values used for compliance auditing (such as required orifice area, for example), according to engineering standards that are applicable to the hazard case. Each hazard scenario determines summary values for all its cases (such as by using sum or maximum, for example). Each protected system determines summary values for all its hazard scenarios, and checks the relevant compliance rules from the engineering standards.

Devices can also have one or more maintenance records, which record the maintenance history of a device. This data can then be used during compliance auditing.

Audits can be conducted on plants, processes, or protected systems. Each audit maintains information on the compliance status of all the devices under purview by the audit. Each audit guides the auditors through the workflow required to perform inspections, certify the results, and sign-off the audit.

Whenever an audit is moved to a new workflow status, a history record is kept on who made the change, when, and why. In addition, when an audit status is changed, copies of all the PSM reports relevant to the status changed can be saved in the document repository in non-proprietary HTML format, for example, so they may be viewed at any time in the future.

Evaluation System Operation and Usage of a Preferred Embodiment

This section describes the various functions and features of the Evaluation System in the perspective of user interactions and operations for the preferred embodiment. As such, this section both describes various input/output capabilities along with the corresponding Evaluation System functionality.

Note that although the system has been described utilizing various subsystems, as shown in FIG. 1, the actual organization of the various functions below is somewhat arbitrary. The subsystems shown FIG. 1 are used for convenient categorization and to utilize commercially available applications, but the actual implementation of these functions into hardware and/or software is not critical, as various hardware and software configurations can be utilized to achieve the same results, and some combinations of functions may be implemented across the boundaries shown in FIG. 1.

Accordingly, referring to FIG. 1, and using the preferred embodiment, the server 3 is utilized to provide information, via the Internet, to a web browser application running on a user computer. The user then provides updated information to the System 1 using the browser running on the user computer, via the Internet, to the reception subsystem 4, which then routes the information to the storage subsystem for storing. Additional subsystems (e.g., report generation 7 and/or assessment 6) may also get the updated information, and/or various user commands, via the reception subsystem. Thus, the user can control various aspects of the system, and add updated information, as described in more detail, below.

Figure 8A:
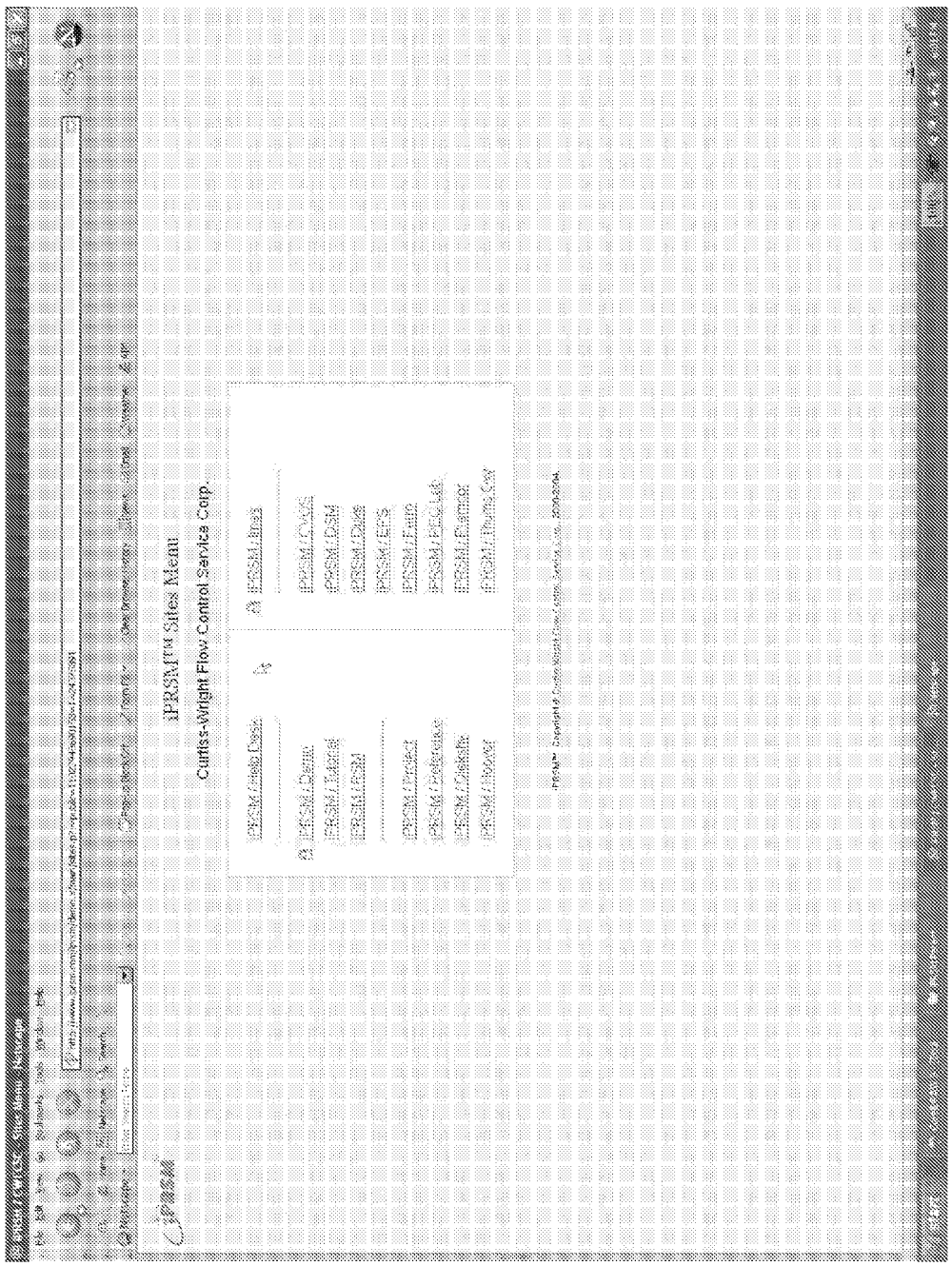
FIGS. 8A through 8X, incorporated herein by reference, that are representative screen shots as displayed to a user of a preferred embodiment of the invention, iPRSM™.
Figure 8B:
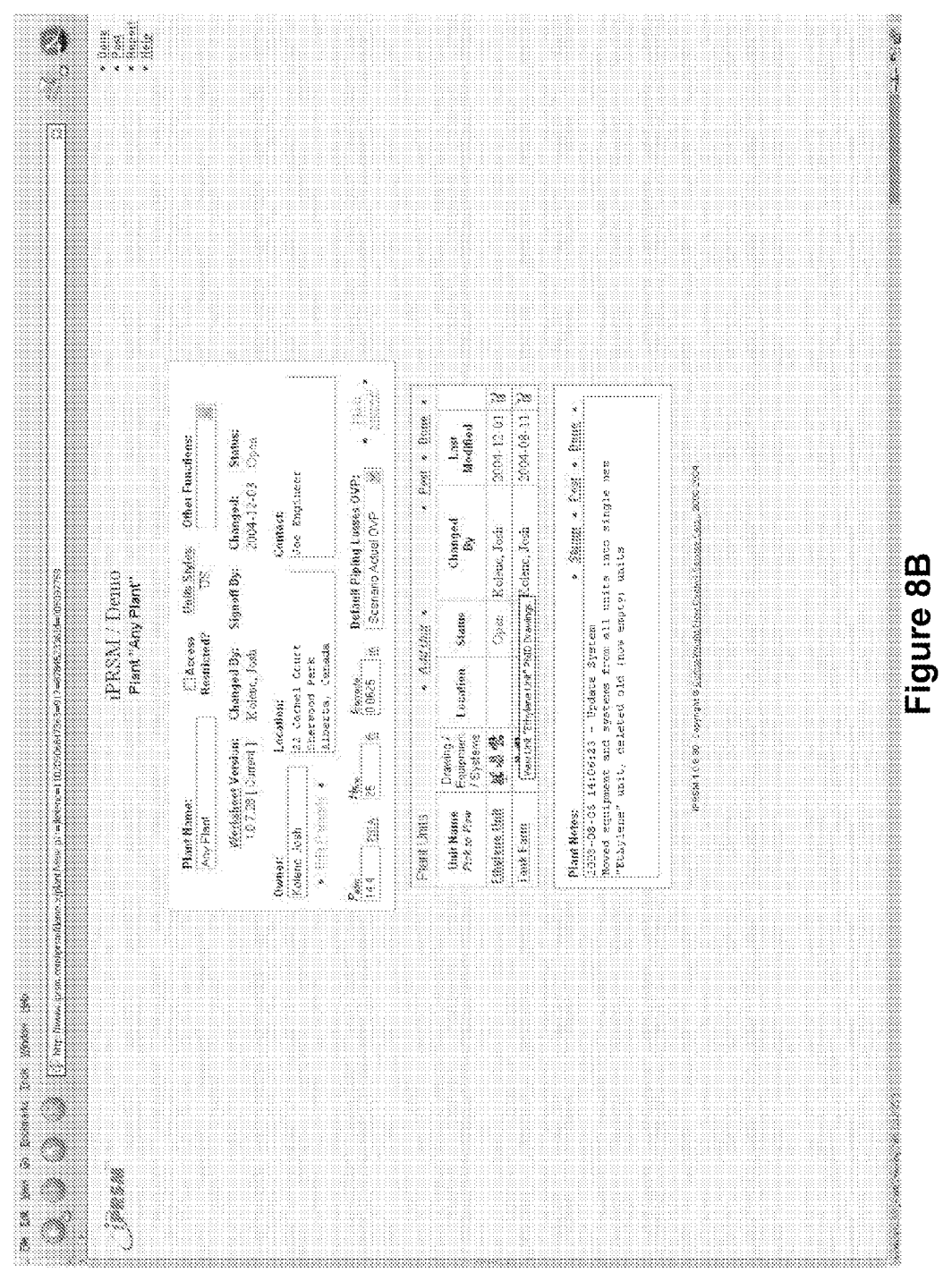
Figure 8C:
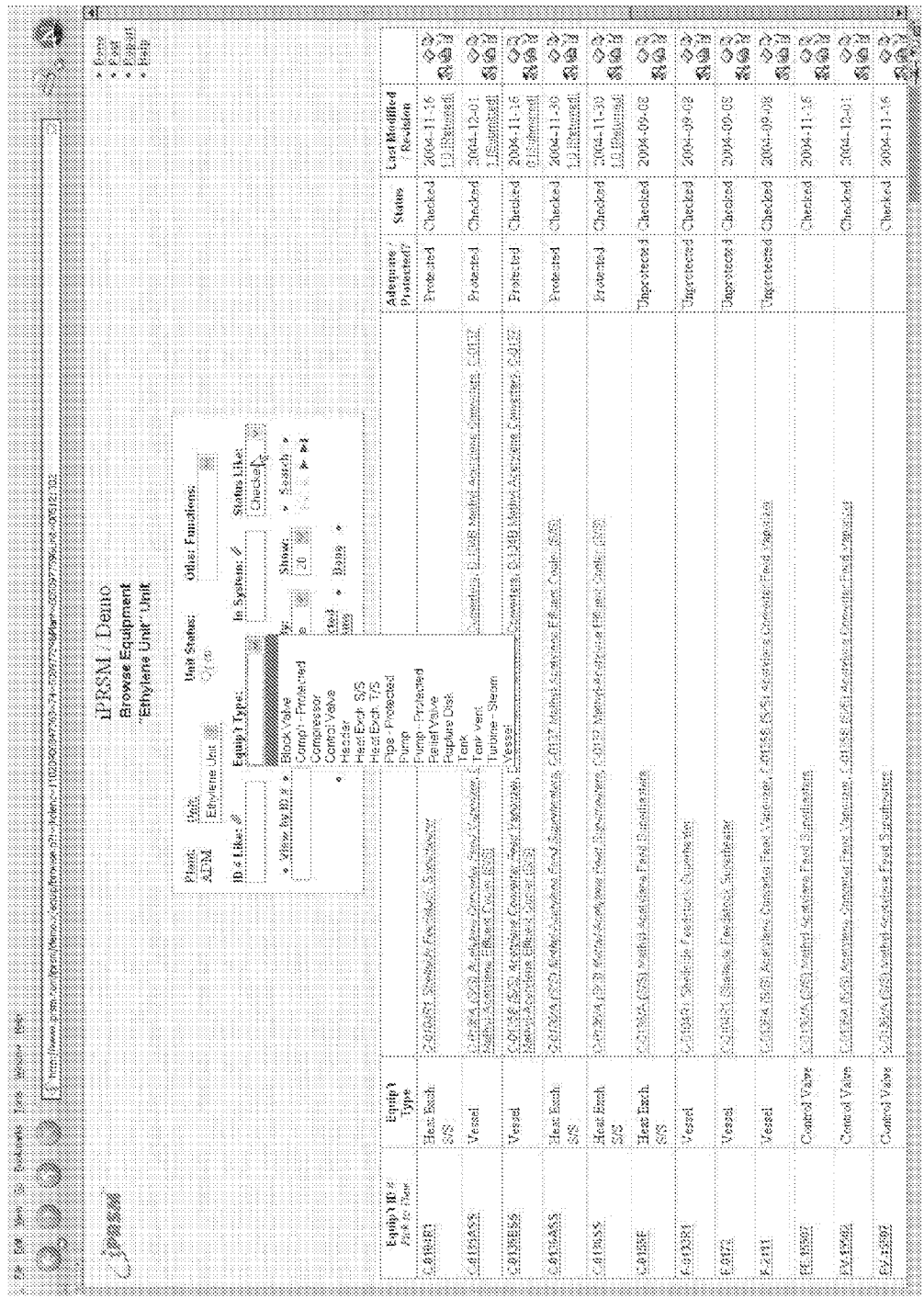
Figure 8D:
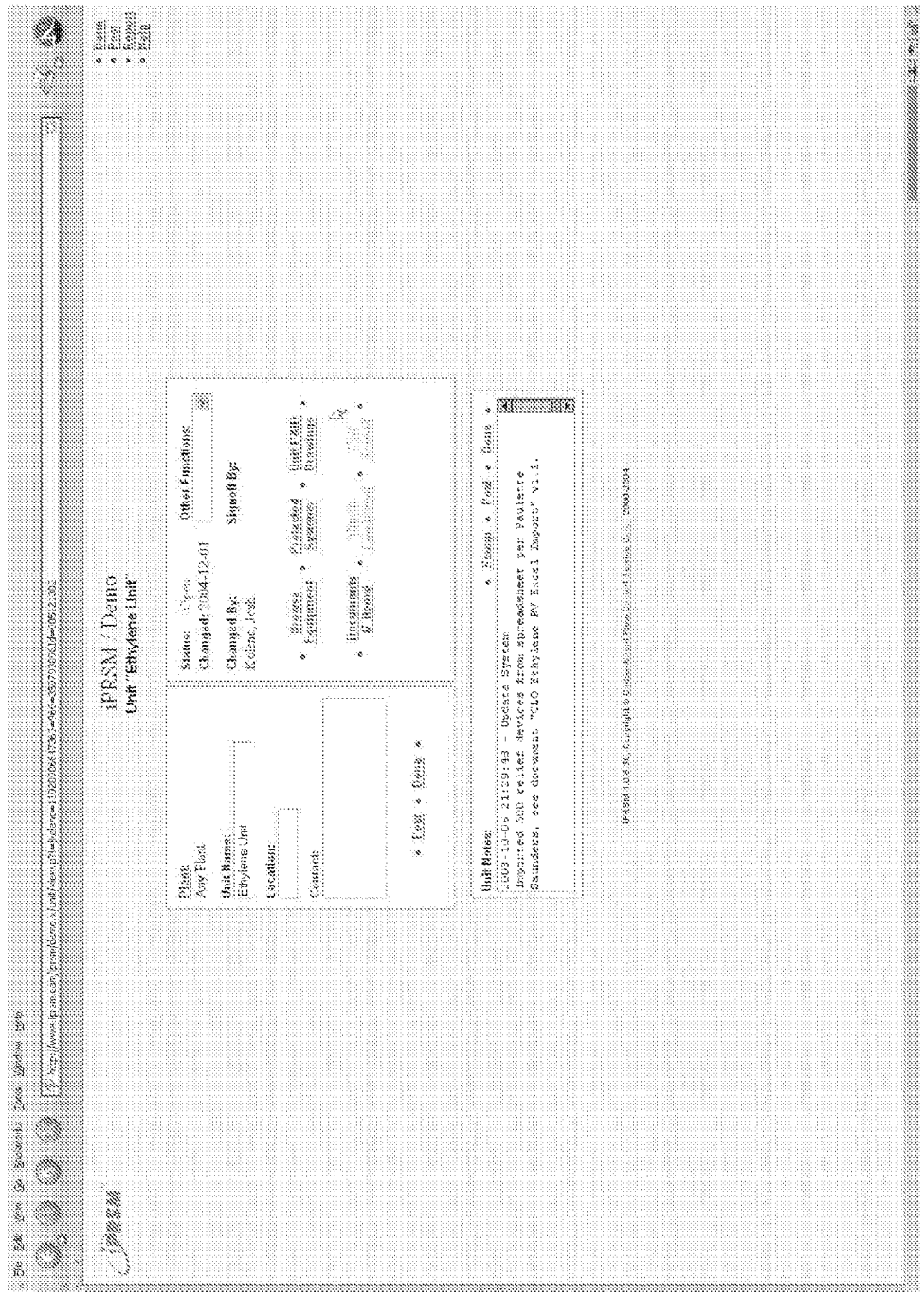
Figure 8E:
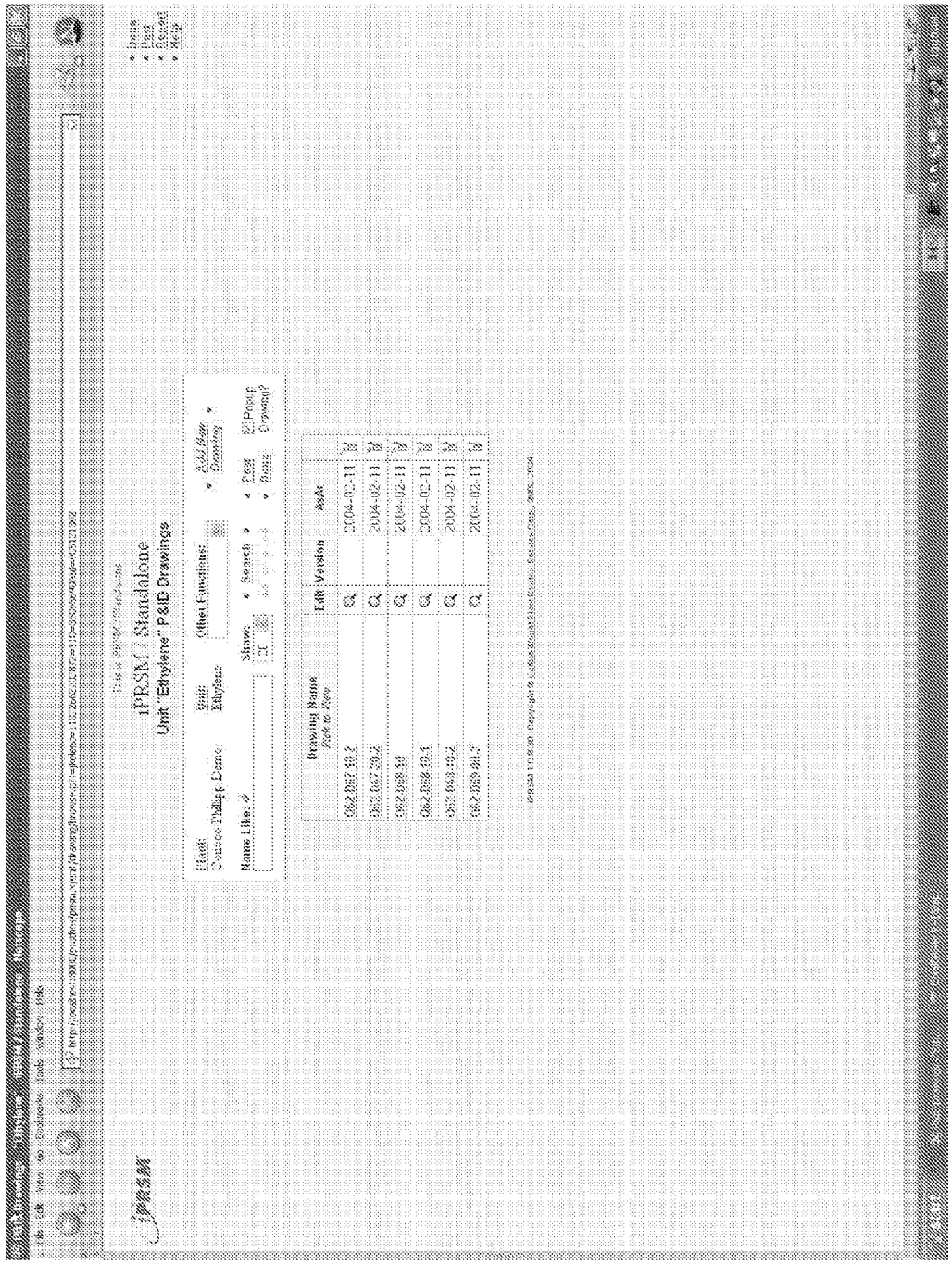
Figure 8F:
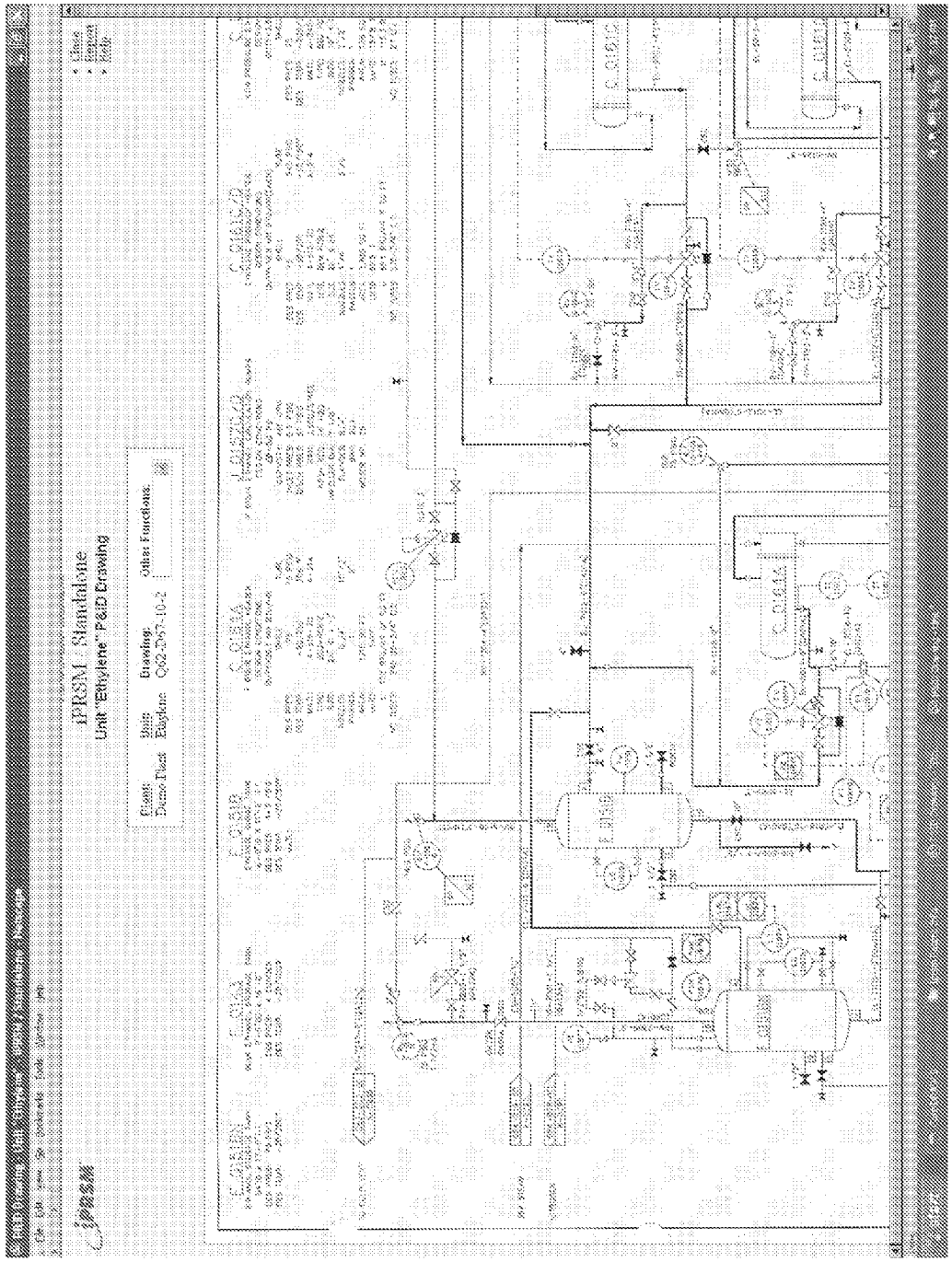
Figure 8G:
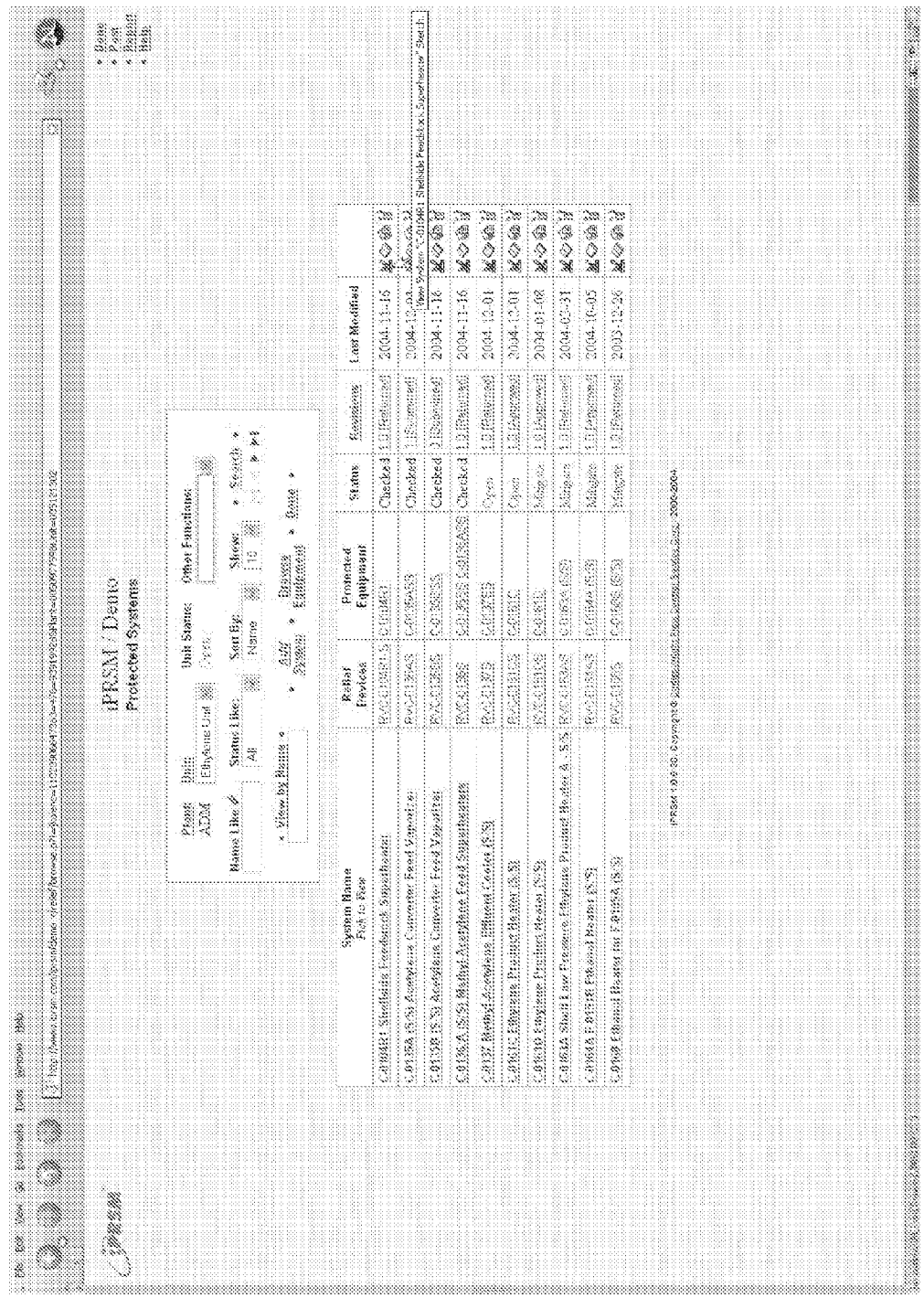
Figure 8H:
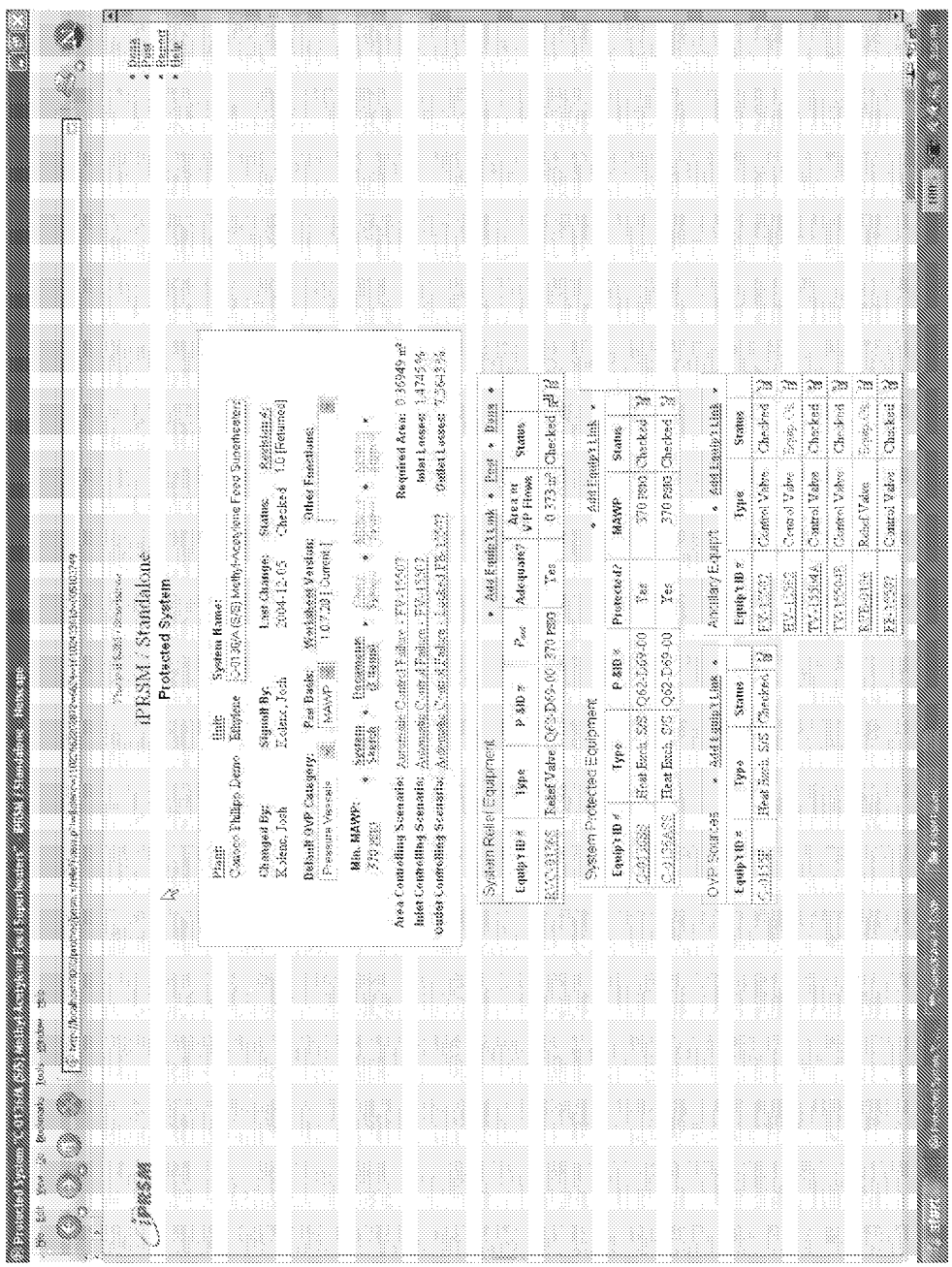
Figure 8I:
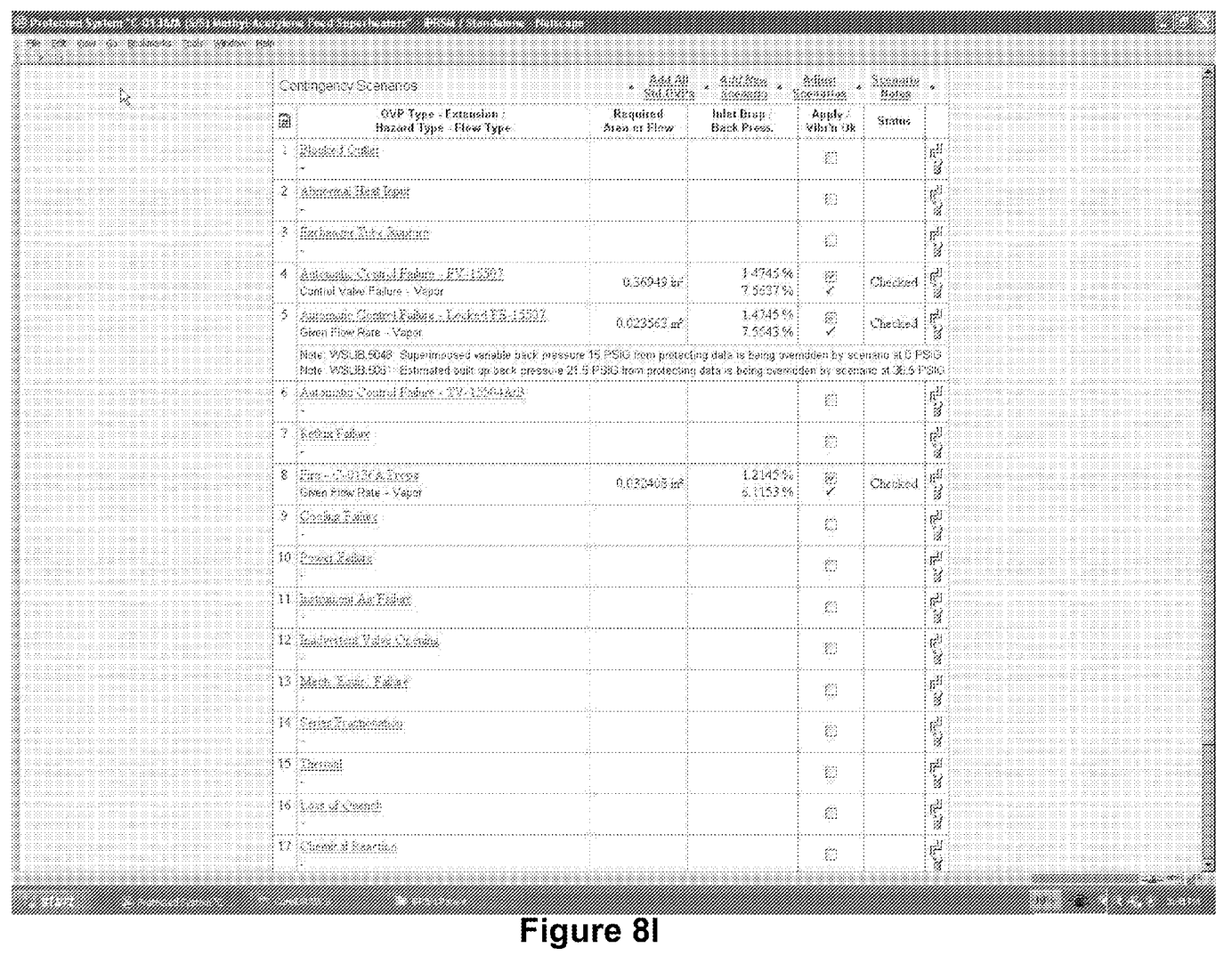
Figure 8J:
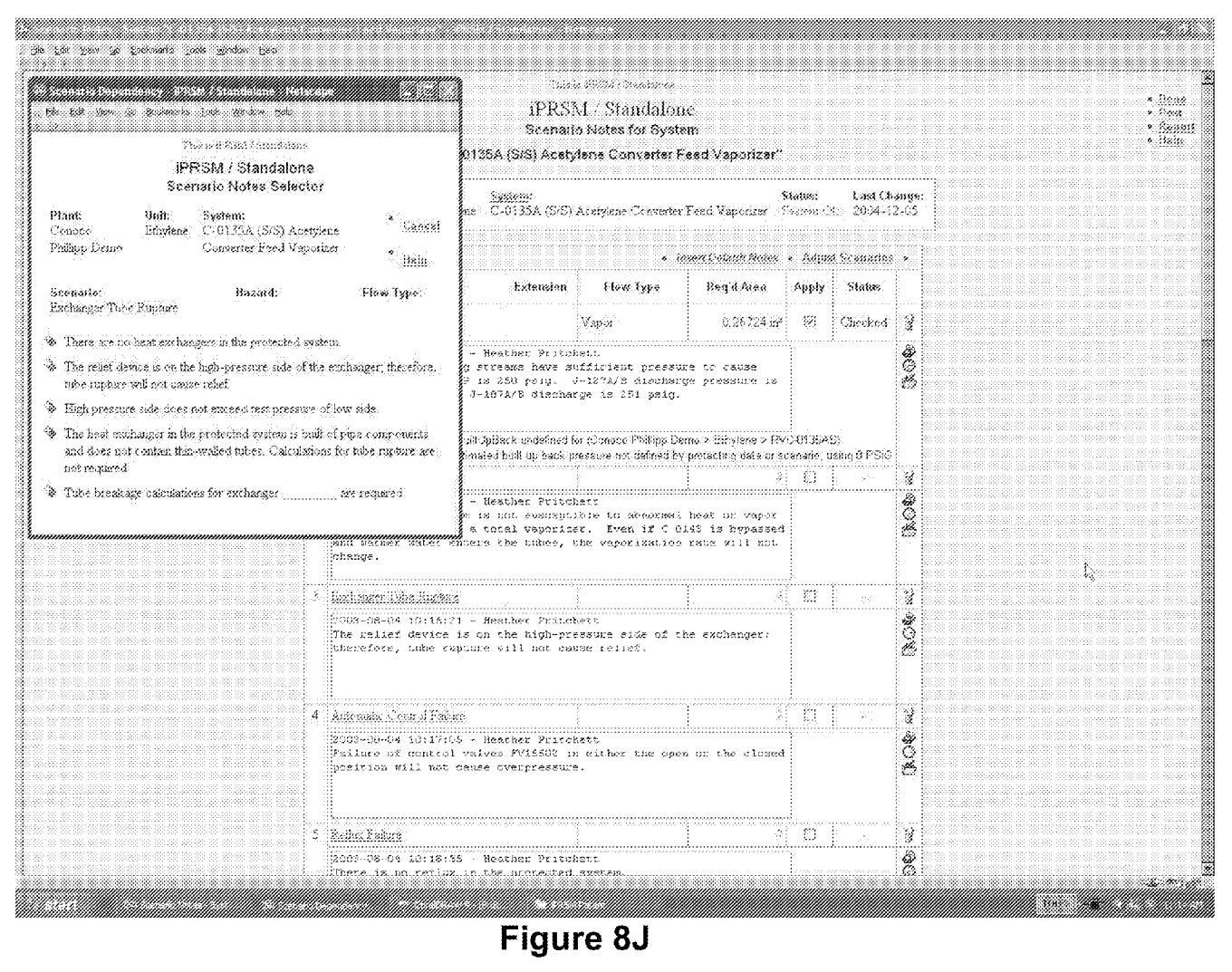
Figure 8K:
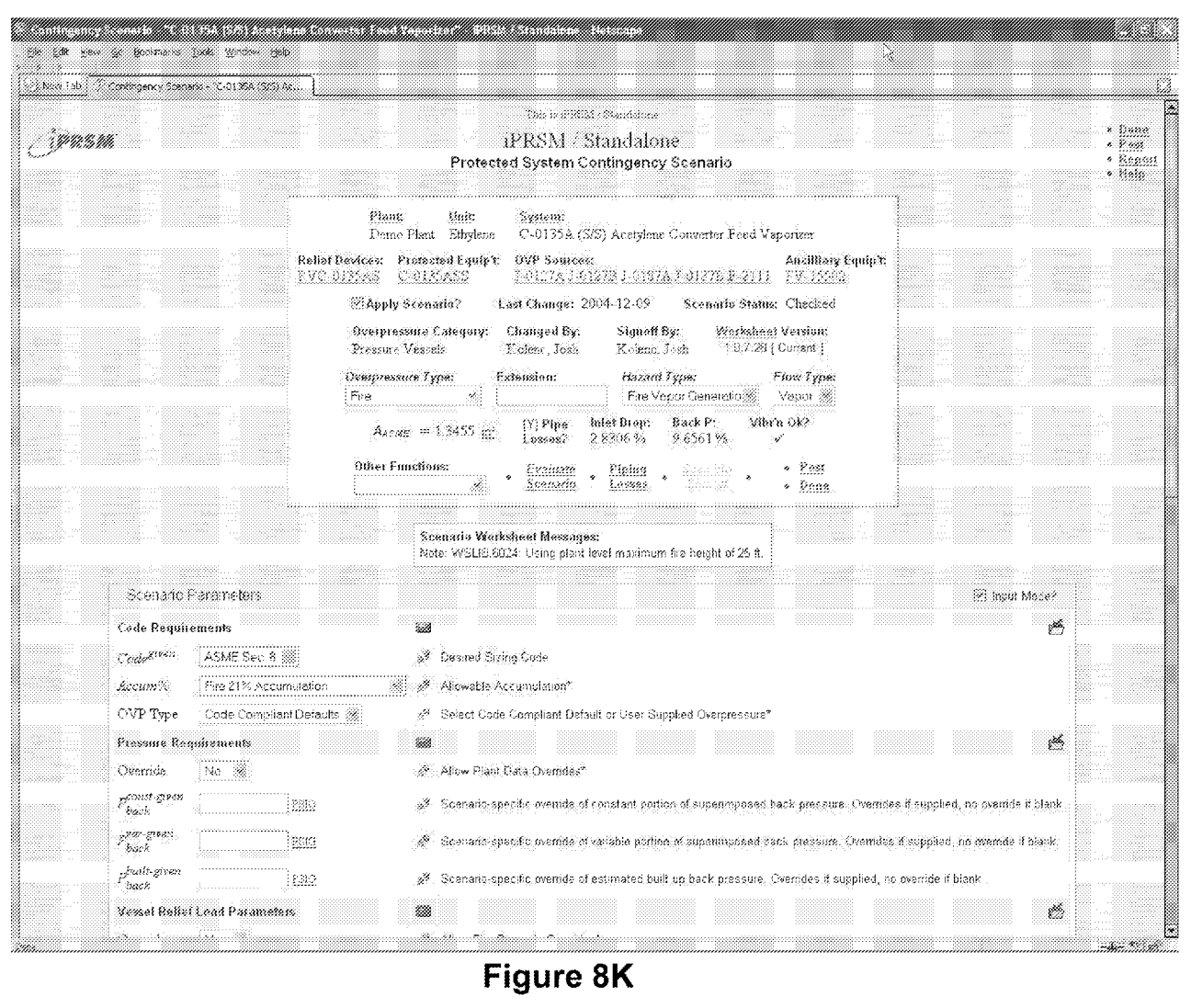
Figure 8L:
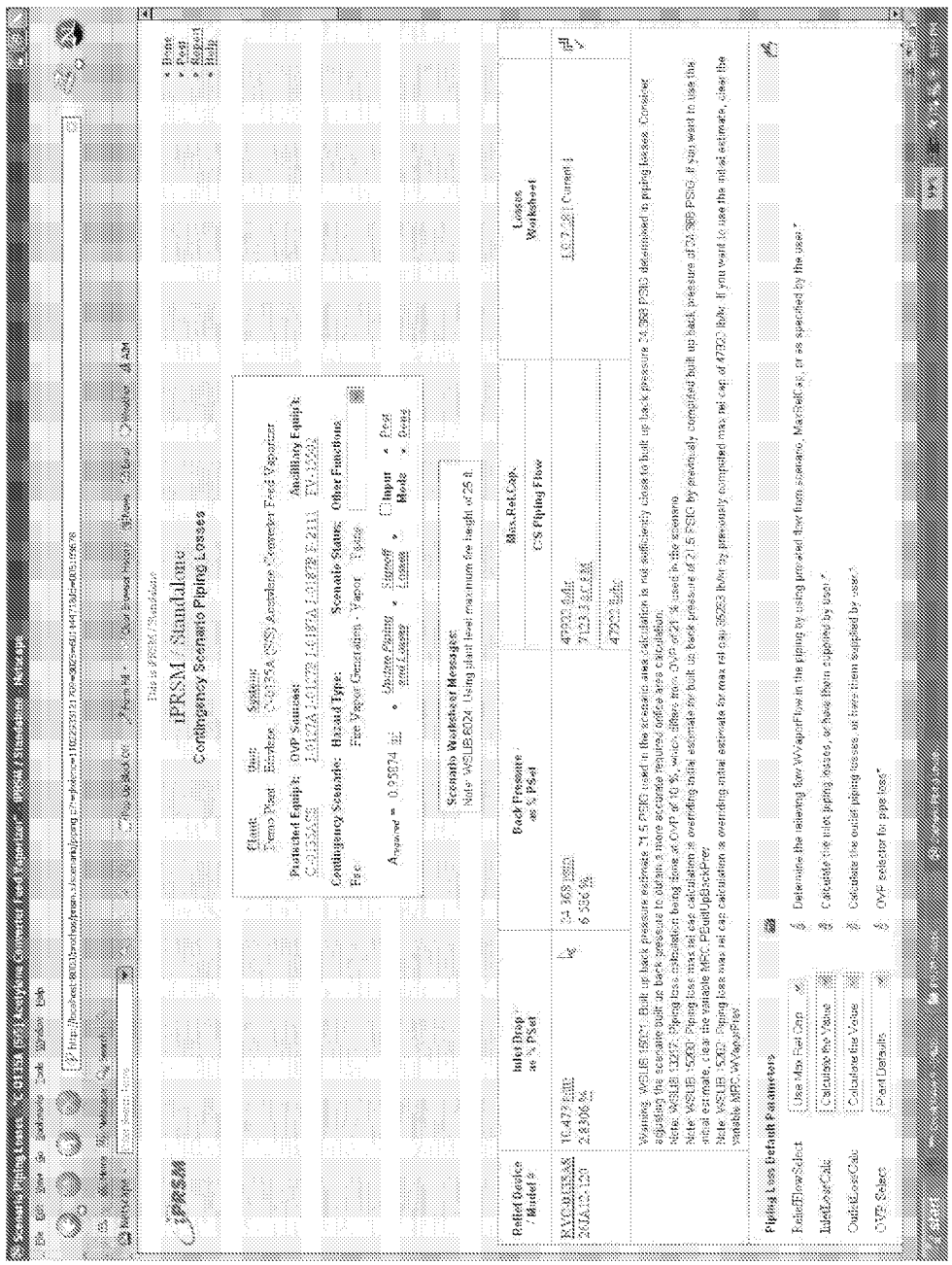
Figure 8M:
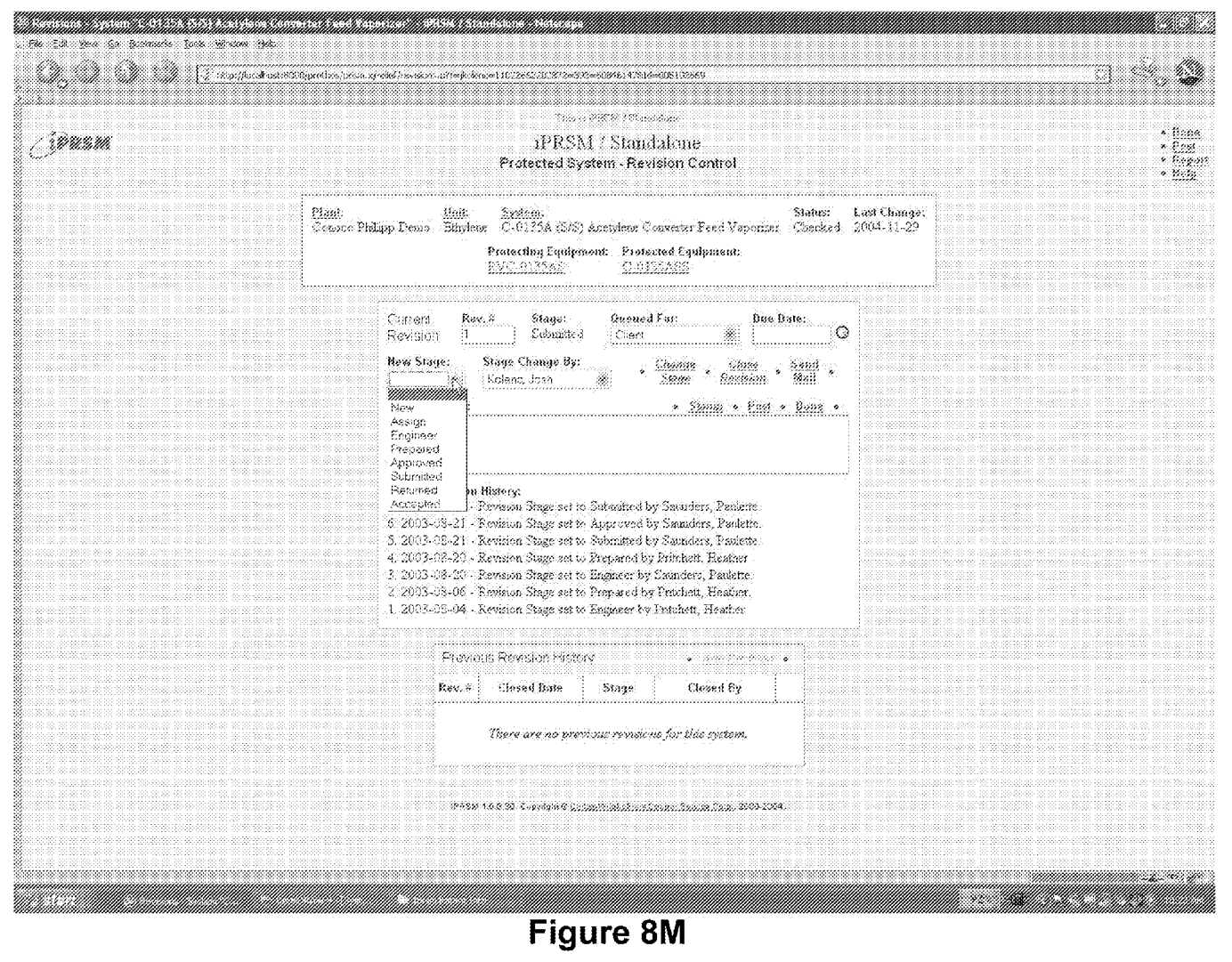
Figure 8N:
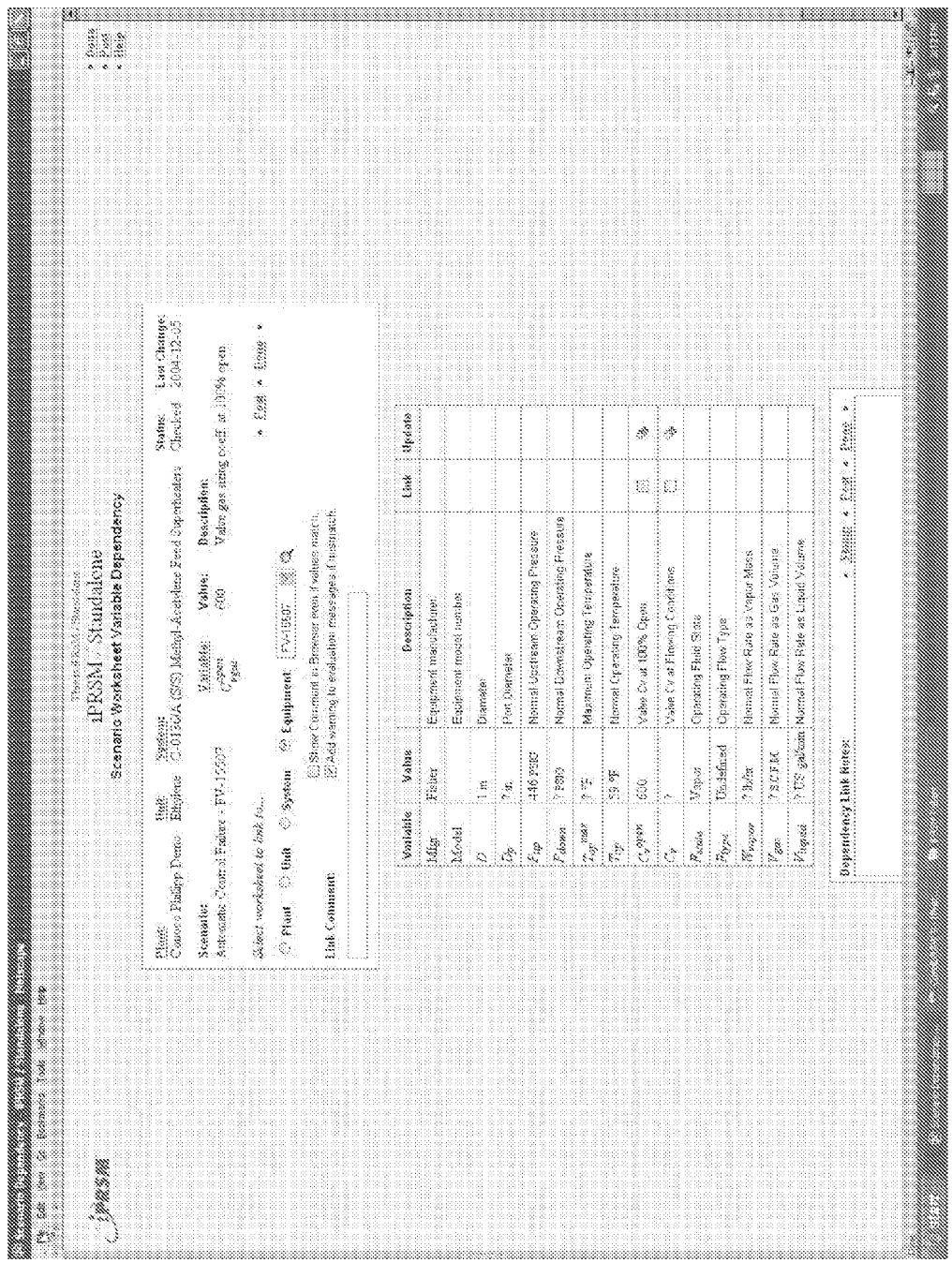
Figure 8O:
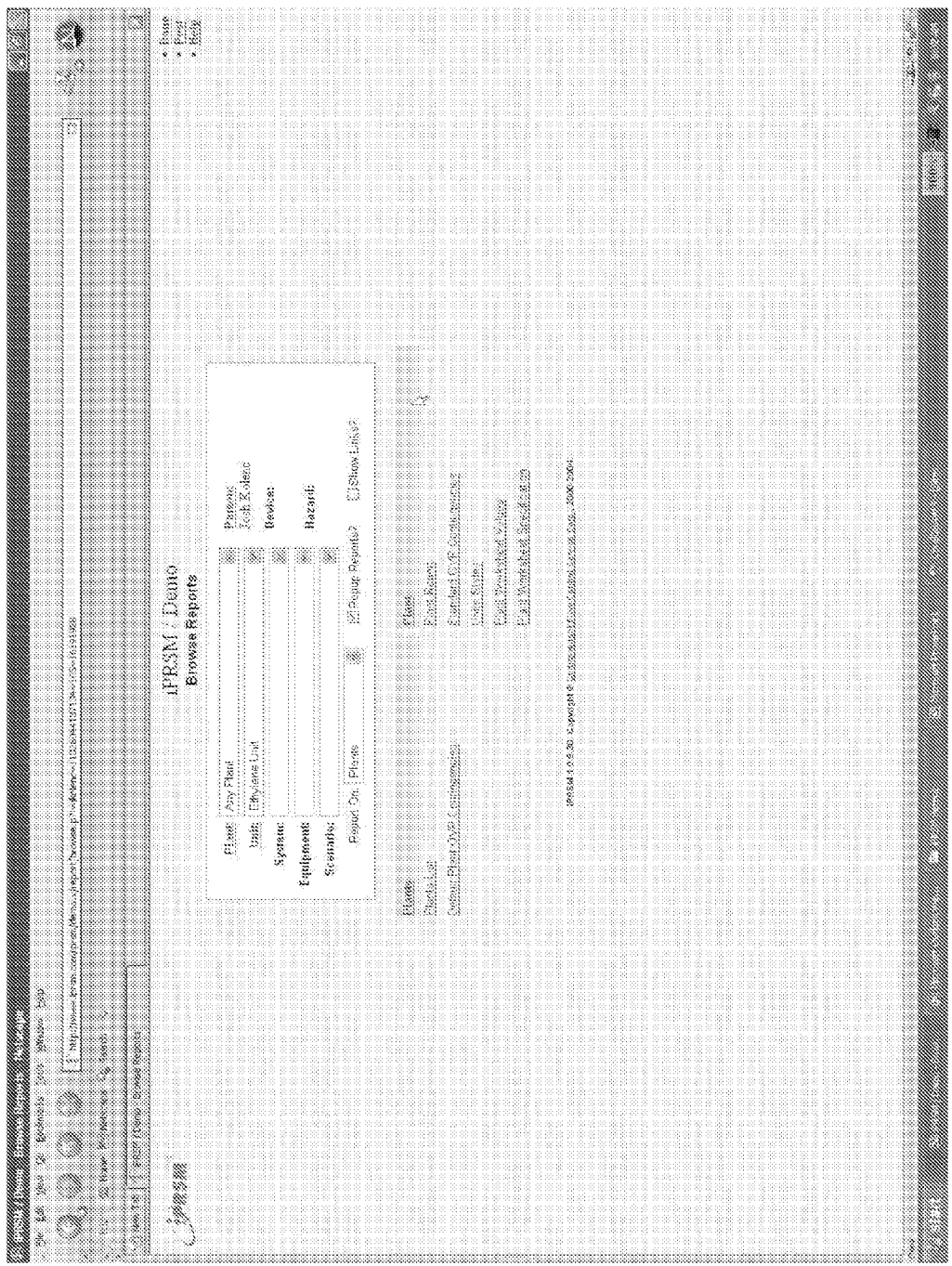
Figure 8P:
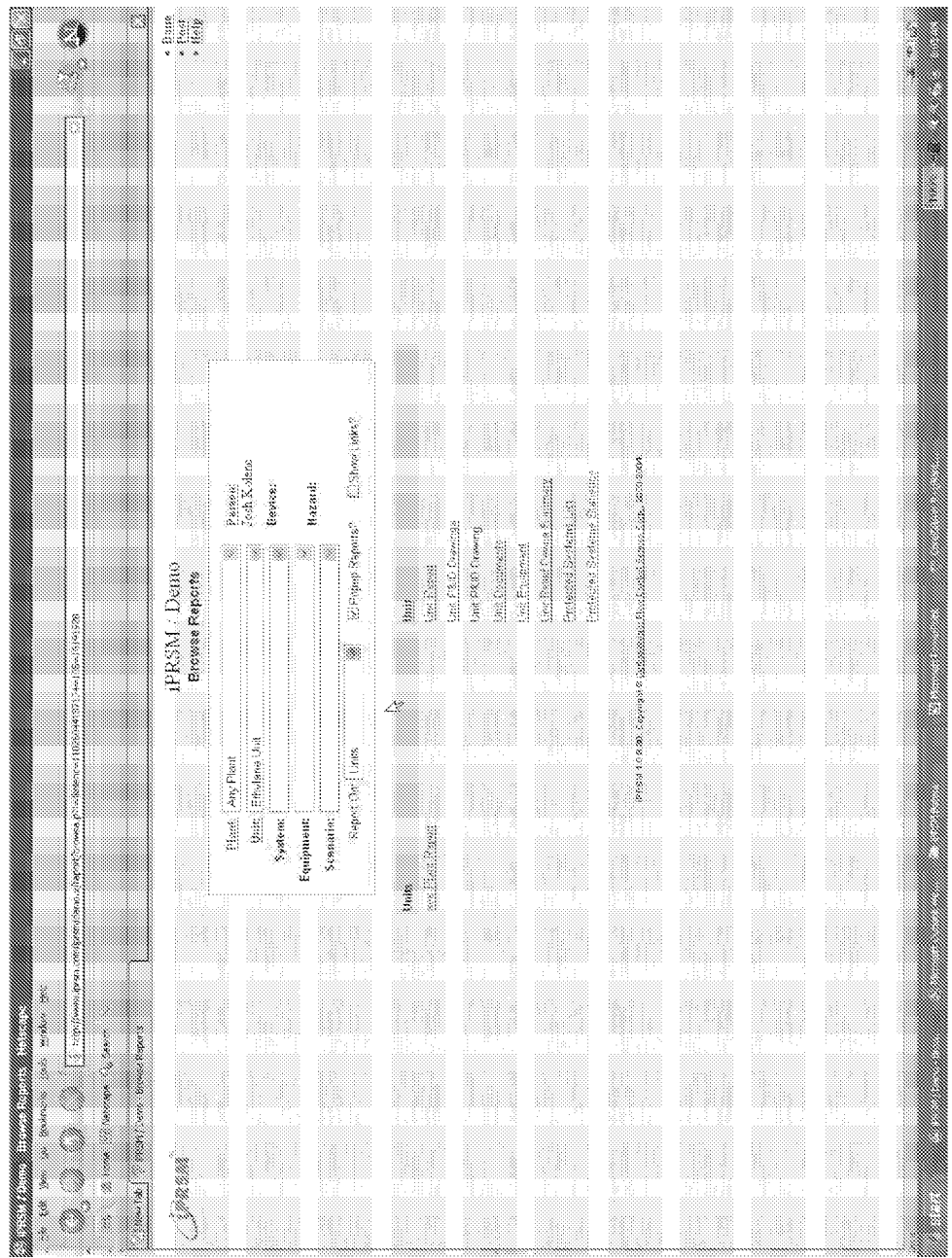
Figure 8Q:
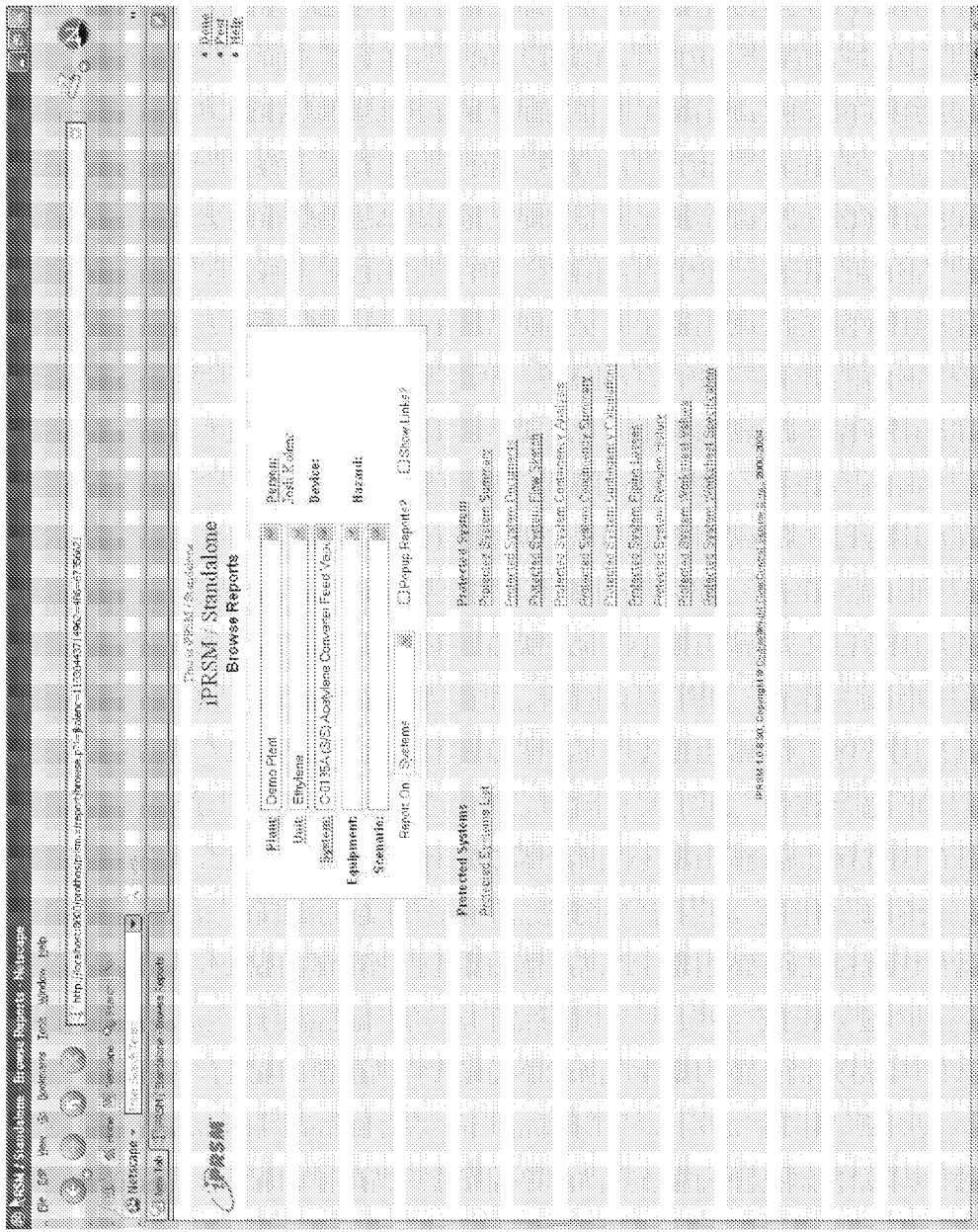
Figure 8R:
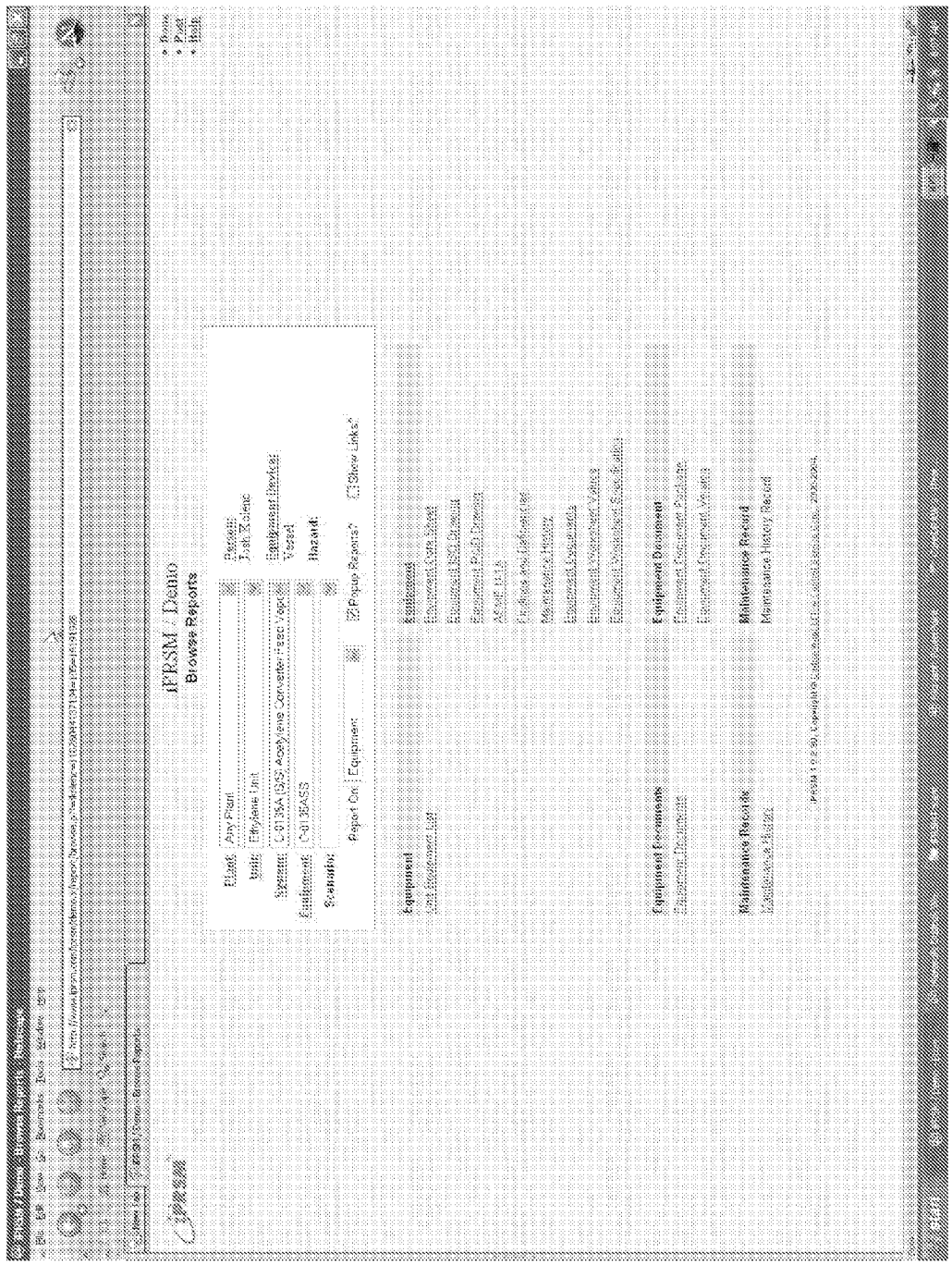
Figure 8S:
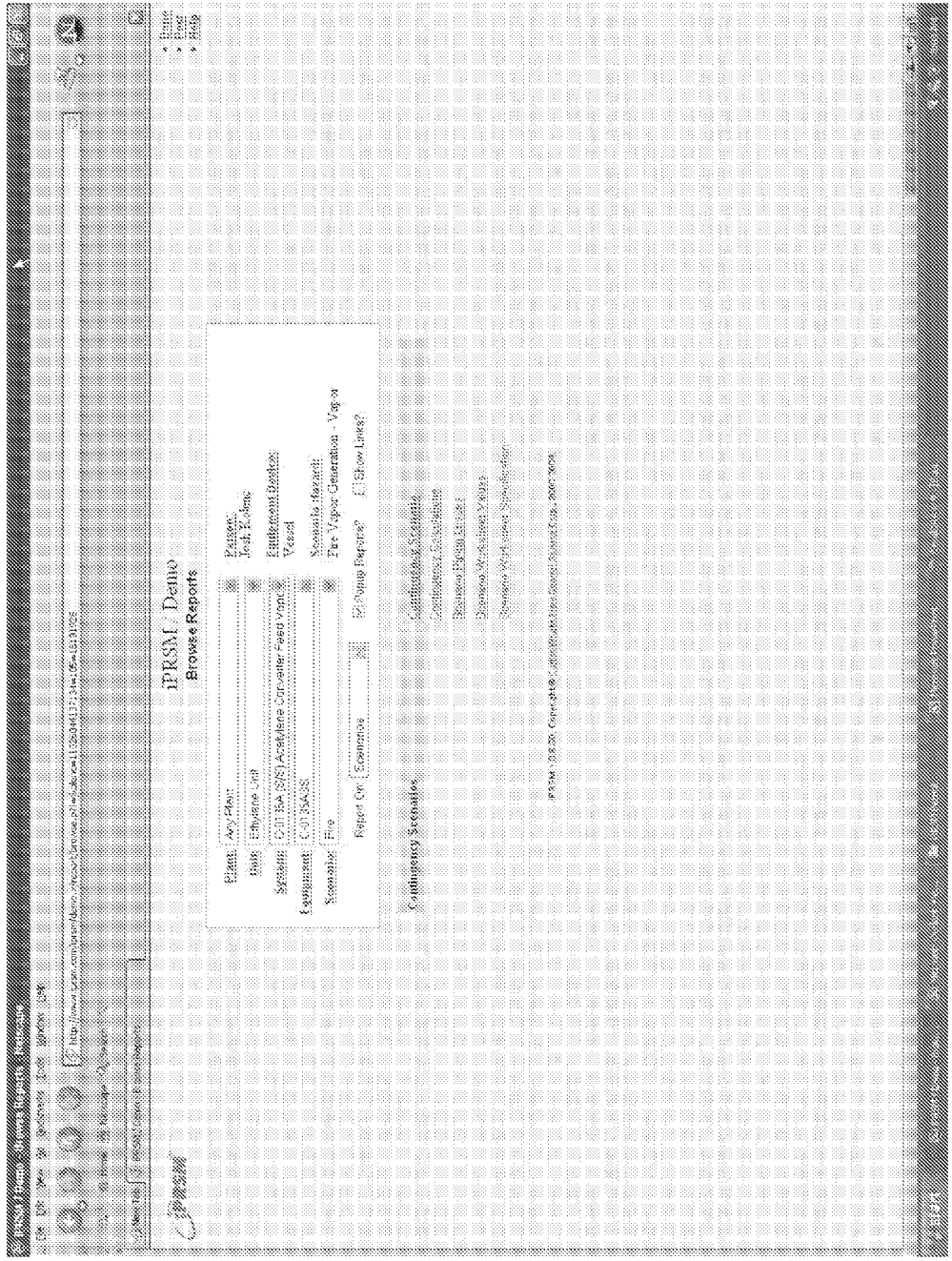
Figure 8T:
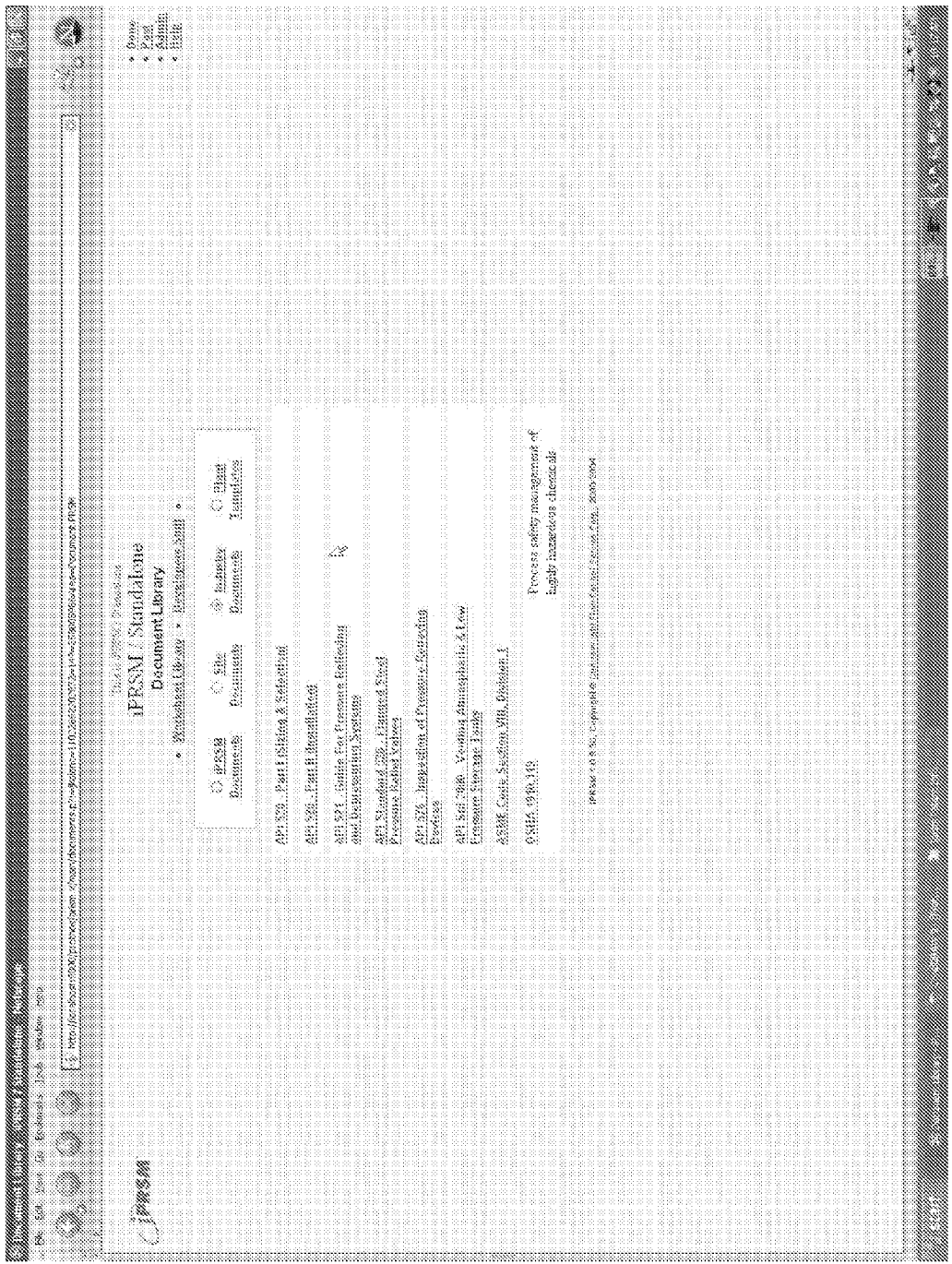
Figure 8V:
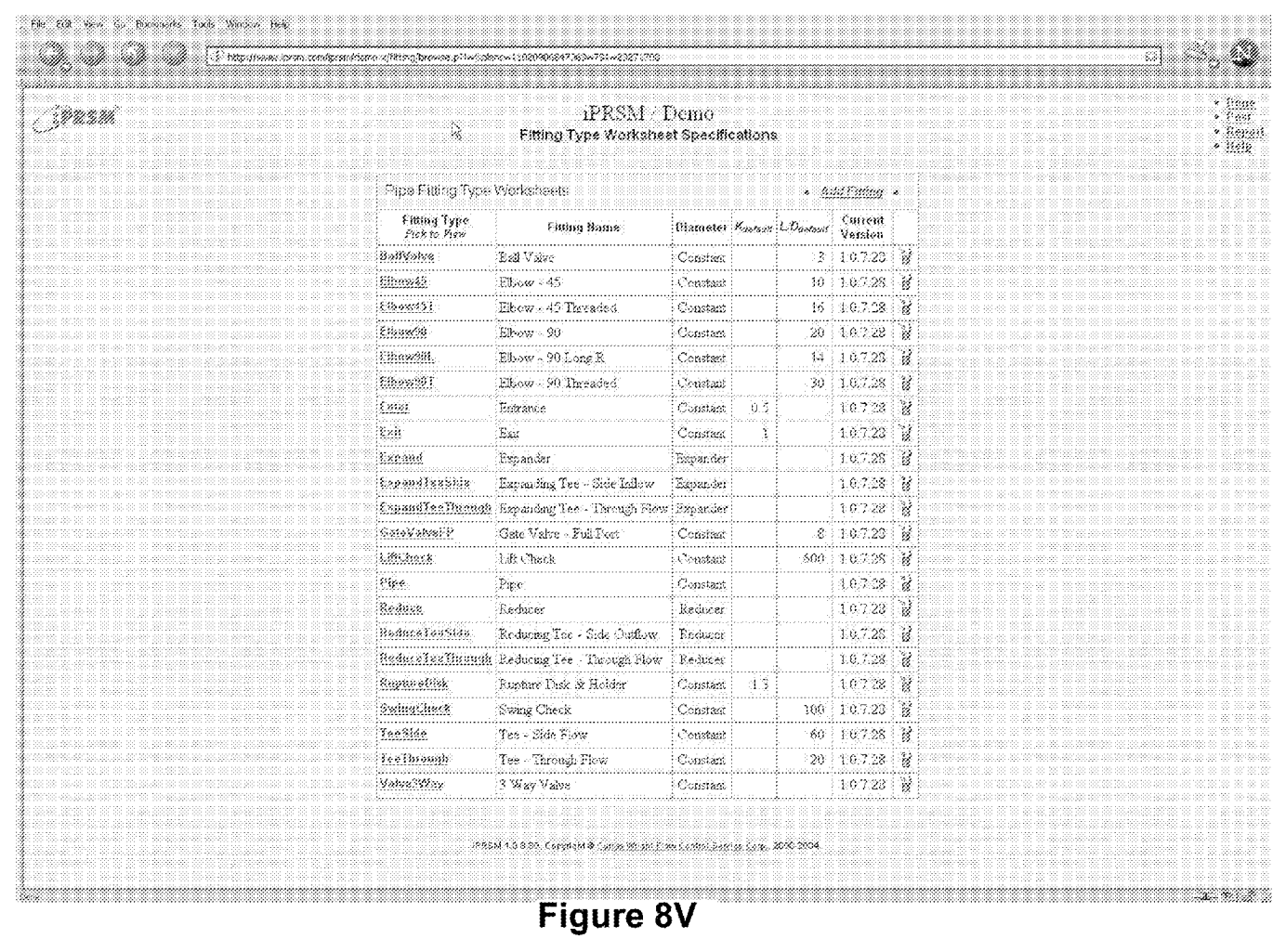
Figure 8W:
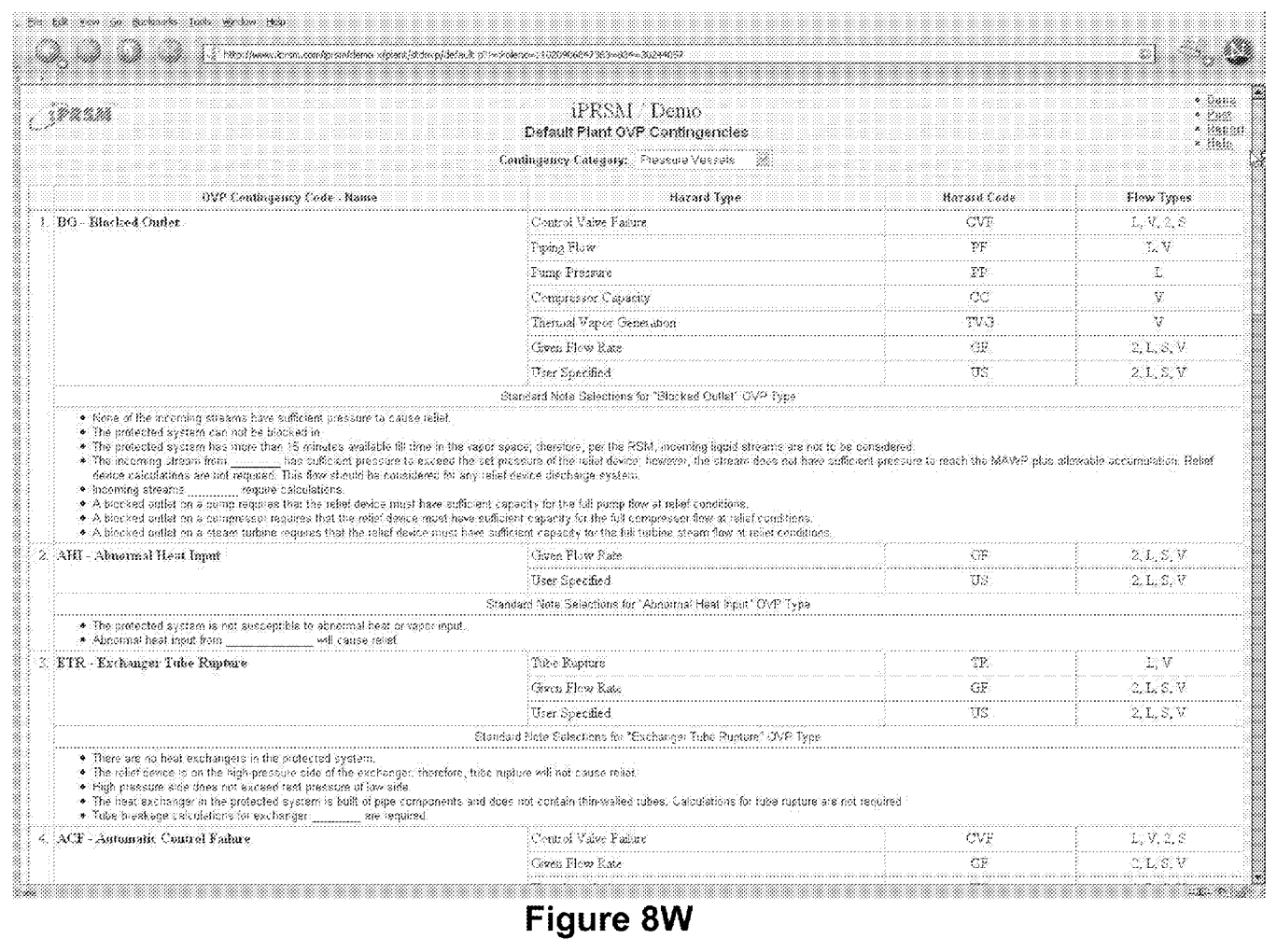
Figure 8X:
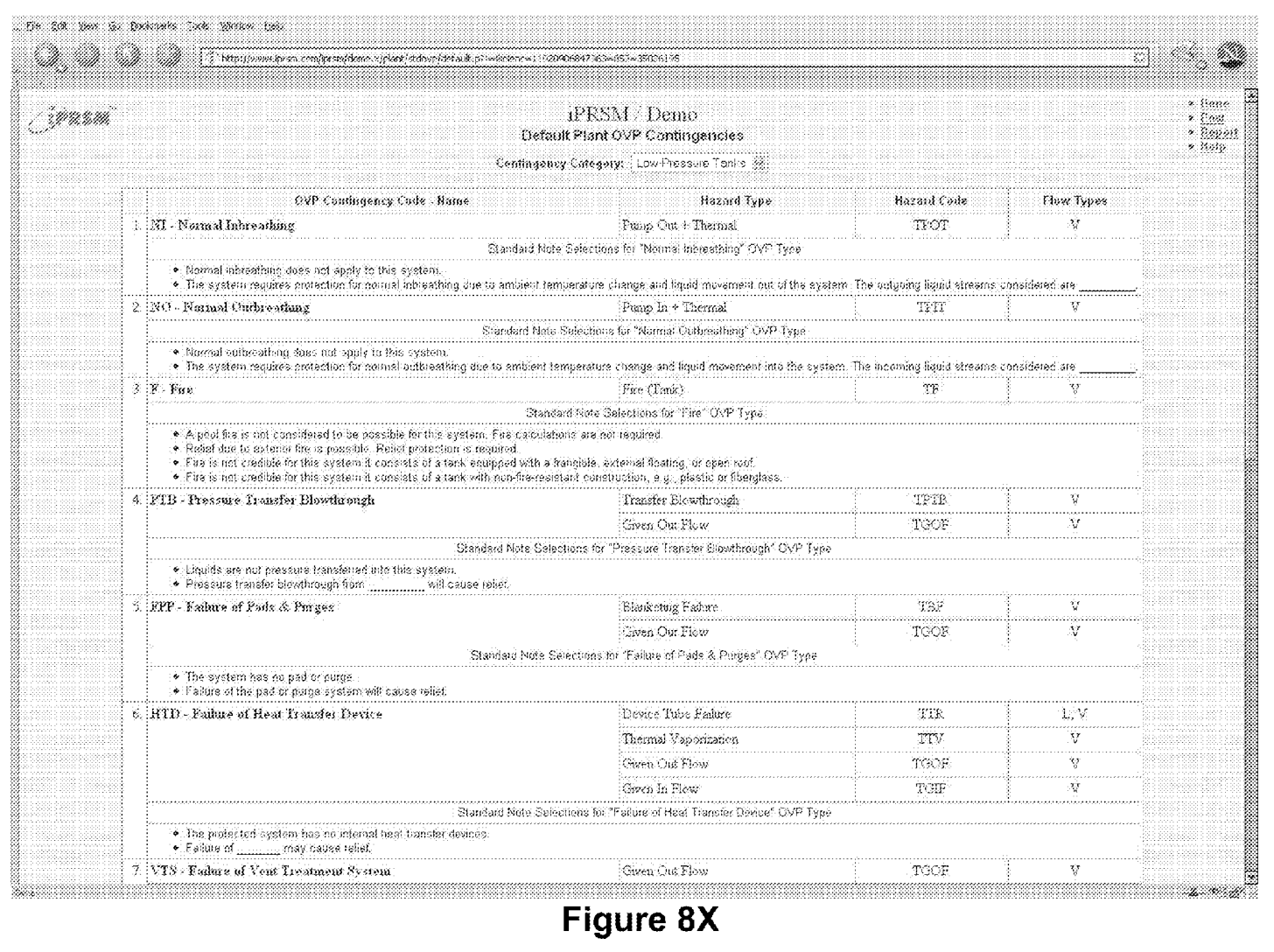

FIGS. 8A through 8X provided in U.S. Application Ser. No. 11/016,001 and incorporated herein by reference show screen shots of a number of the functions described below, for a contemplated commercial embodiment of the System, as they might be seen by a user of the system, displayed by a web browser on the user computer.

The assessment subsystem 6 is utilized to provide the various assessment and auditing reviews of the process system being evaluated, while the report generation subsystem is used to generate support documentations, as necessary, to provide a proper paper trail or explain results, as needed. Accordingly, the various features and capabilities described below can be allocated to the various subsystems consistent with this overall framework.

The Evaluation System web pages and display information, which are served by the server to the user, are designed to use one or more common elements combined according to one a number of different styles. The Evaluation System uses the common edit boxes, checkboxes, dropdowns, and radio buttons. Their appearance may depend upon the web browser used. Action buttons are specially marked links. As you pass your cursor over a link, its marks change. Menus are composed of action buttons arranged horizontally, vertically, or in dropdown menus.

Page access is also controlled in the preferred embodiment of the Evaluation System. Users can be given specific access privileges that govern what pages can be viewed, and what actions are available on those pages. Furthermore, only the Login page can be bookmarked. No other the Evaluation System web pages can be revisited once a browser window is closed.

In a preferred embodiment, Italic links are used initiate actions that make changes to the database, and generate confirmation dialogs when picked. Non-italic links are used for navigational purposes, and do not generate changes to the database.

The Evaluation System of the preferred embodiment uses small icons for indicators and actions. A short description of an icon's function is displayed when a cursor is paused over the icon for a second or two. A descriptive catalog of the icons called Common Icons used in the Evaluation System is available.

There are at least two types of dialogs used in the preferred embodiment: browser dialogs and application dialogs. Browser dialogs are used for simple confirmations. The application dialogs are pop-up windows that are small web pages with controls that are used to collect data or perform special operations for their parent pages.

Various collections of data require different display page types. The following types of pages are used in the Evaluation System:

Browsers display a list of one or more items in a table. Browsers usually have controls to select and sort the displayed items, and controls to scroll through results too numerous for display on a single page. Each row contains data for one item, a way to zoom to details about that item, and in some cases, controls to operate on it.

Viewers display details for an item, sometimes for editing. A viewer may incorporate a browser if its item can contain other items (e. g., a plant contains units).

Pop-Up Dialogs are small pages that pop up from a browser or viewer to allow special data entry, selection, or sequencing operations to be performed for an item.

Report Menus are a collection of links to individual reports, in some cases with controls for selecting and sorting report data.

Reports display details for an item, suitable for printing by a browser application.

There are typically no controls on report pages, so a browser's Back button can be used to return to a report's previous page.

Using the Database: the Evaluation System's database is designed to be used by many users at once, in some cases over a network connection that cannot be trusted to be available from page to page. These factors make using the Evaluation System database slightly different from using desktop-based databases.

Because of the nature of the connection between a user computer and the Evaluation System server, the data displayed on a user computer is a snapshot of the data held for that item.

When a user makes changes to the data, the changes are not transmitted to the database until the user selects Post, Done, or another operational link. Using the browser's Back button typically will not save the changes to the database. However, most application buttons or operational links that cause a new page to be loaded attempt to save any changes that have been made to the current page before displaying the new page.

Other users may request the same page as a particular user, and thus receive their own snapshots, but only one person can save changes at a time. If another user saves changes to the other user's snapshot first, the user will be unable to save the changes to his snapshot, but will have to refresh the snapshot first to update his data, and then modify the newly-updated data.

As an Example: A user requests the Evaluation System to view data about a valve (by clicking on a link or button displayed by a browser, for example). The Evaluation System packages it up and sends the user a webpage via the server. Then the telephone rings, and the user deals with the call. In the interim, another user else retrieves a snapshot of the data for the same valve, makes changes to their snapshot, and saves the changes successfully.

After the call, the user attempts to change some of the valve's data (by inputting data into a web form, for example)

and wants to save it back to the database (via the reception subsystem to the storage subsystem). However, the Evaluation System detects that the data has changed since the time the user retrieved it, and refuses the change, displaying an error message instead.

In the error message is a link to Reload the page the user was viewing, which, when selected, presents the user with the valve's updated data, and the user must now re-enter the desired changes. A small pop-up window with the word "Posting . . ." comes and goes as the user Post his changes. In cases where changes cannot be saved, this window expands to display an error message and suggest remedial actions.

Dates and Times: Because the Evaluation System is designed for use in international environments, all dates and times preferably use the ISO-8601 format: yyyy-mm-dd [hh:mm:ss]. Example: 2003-10-31 [17:18:26]

A user can run multiple application windows in cases where the user needs to refer to one or more other pages while working. The Evaluation System logo can be used to open a new Evaluation System Main Page, allowing multiple pages to be simultaneously browsed for multitasking.

For smart navigation, the user can pick Post and then right-click the browser Back button to save changes and safely navigate directly to any page in the navigation history list. The user can pause the cursor over any icon in a browser window to view an instructional popup tool tip.

Overview

Menu and Action links are marked with Common Navigation Icons, which change as the cursor moves over them. Pick the link to take the action. Use these icons to page through multiple items in groups. From left to right, they represent First, Previous, Next and Last items. They appear grayed when paging is not possible for the current set of items. Select Post to Save changes to database.

Additional features include viewing a drawing in a separate window; viewing list of associated documents; and viewing a menu of associated reports. Furthermore, a variety of icons are provided which are linked to various functionality, including: Equipment; Equipment Pipe Fittings; Equipment Maintenance History; Equipment Findings; Protected Systems; Protected System Contingency; Piping Losses; Add; Add Under; Delete Record—Delete the record from the database; Archive Record—Archive the record so that it does not appear in views on the current database; Re-sequence—Access a re-sequencing popup and change the order of items in a list; Evaluate—Resolve outstanding calculations; Select File—select indicated file for use; Send Mail—Send email to another application user; Erase—Clear the value in a field; Clock—Enter a current timestamp in a date/time field; Select Entries—Open a page from which to select one or more entries to fill a field; Parameter Information—Access parameter information; Create a Parameter Link View or Edit a Parameter Link View or Edit a Bad Parameter Link; Select Orientation Angle; Ok; Not Ok; Locked by another user; Locked by current user; Mail Sent—Email sent.

A quick-reference summary of the web application workflow and functionality includes the following list of functions:

Log in/out
Add a plant
Add a unit to the plant
Add equipment to a unit
Add protected systems for a unit
Add contingency scenarios for a protected system
Evaluate piping losses for a contingency scenario
Evaluate contingency scenarios for a protected system
Check and sign off a protected system
Check equipment for a unit
Check and sign off a unit
Check and sign off a plant The above functions are described in more detail in the following examples:

Logging in: A user points his web browser to the appropriate website URL, enters the appropriate Login ID and Password, and picks the appropriate Login link to access the Evaluation System main page.

Logging out: On the main page, the user picks the Logout link. Merely closing the browser windows may not provide a secure logout under some operating systems.

Adding a plant: On the Evaluation System main page, pick the Add a Plant link and confirm to create a plant and access the add plant view. Enter a new Plant Name, a new Plant Owner, and select a template from the New Plant Template dropdown. Pick the Add Plant link and confirm to access a blank plant view in which to enter detailed plant information. Enter additional plant details as required, then pick Post.

Adding a unit to the plant: In the plant view's Plant Units table, pick the Add Unit link and confirm to create a unit and access a blank unit view in which to enter detailed unit information. Enter a Unit Name, Location, and Contact information. Pick Post.

Adding equipment to a unit: In the unit view, pick the Browse Equipment link to open the equipment browser.

Add one or more pieces of equipment: For each piece of equipment, pick the Add New Equipment link, enter a unique identifying string in the ID# box, then pick OK to create the new piece of equipment and access a blank equipment view in which to enter new equipment information. Select a device type from the Device Type dropdown. A parameter panel appropriate to the device type will open. Enter equipment details and parameters. Pick Add More Equipment from the Other Functions dropdown to refresh the equipment view and add more equipment, or pick Done to return to the equipment browser. A basic protected system requires a relief device, a piece of protected equipment, and an overpressure source.

For relief equipment, in the equipment view, also use the add icons icon to add associated equipment, pick the Piping & Fittings link to access the equipment piping browser and view, edit, and evaluate inlet and outlet piping and fittings. Pick the Piping Losses link to access the equipment piping losses browser and view piping losses information for each contingency scenario that is applied to a piece of protecting equipment's protected system. Pick the Findings & Deficiencies link to access the equipment findings view and enter findings and deficiency details.

Adding a protected system for a unit: In the unit view, pick the Protected Systems link to access the protected system browser. Pick the Add System link and confirm to create the protected system and access the protected system view. Enter a System Name and Default OVP Category, and select a value from the Pset Basis dropdown. Pick the Add Equipment link in any of the System Relief Equipment, System Protected Equipment, OVP Sources, or Ancillary Equipment tables to access the link equipment view and select equipment of the appropriate type to link to the protected system. Note that only equipment already added to the unit and not already used in another protected system is available to be linked to a protected system. From the Other Functions dropdown, pick Add New System to refresh the page and add another protected system, or pick Done to return to the protected system browser.

Adding a contingency scenario for a protected system: From the Contingency Scenario table in the protected system view, pick the Add New Scenario link and confirm to add a scenario and access the contingency scenario view. From the Overpressure Type, Hazard Type and/or Flow Type dropdowns, select OVP type, hazard type, and/or flow type. A parameter panel appropriate to the scenario will open. Enter scenario parameters then pick the Evaluate Scenario link or a Calculator icon. Correct problems described by any warning messages, and repeat evaluation until the scenario is successful. Pick Done to return to the protected system view, or pick Piping Losses to access the piping losses view and proceed with evaluating and signing off piping losses.

Evaluating and signing off piping losses for a contingency scenario: To access the piping losses view, pick the Piping Losses link in the contingency scenario view or pick a piping losses icon in the Contingency Scenarios table of the protected system view. Pick the Update Piping and Losses link to update piping parameters to current values and open parameter fields for editing. Pick the Evaluate Scenario and Update Piping and Losses link if the scenario has not yet been evaluated to evaluate and open parameter fields for editing. Edit parameter values as required and pick a calculator icon to evaluate piping losses until the result is satisfactory. Pick the Signoff Losses link to sign off on piping losses. Piping status will change to "OK". Pick Post to post changes or Done to post changes and return to the previous page. Evaluating, signing off, and un-checking a contingency scenario for a protected system. In the contingency scenario view edit parameter values as required.

Optionally, pick an unlink icon to open the parameter dependency worksheet and specify a parameter dependency for the selected value. Pick the Evaluate Scenario link or a calculator icon to evaluate the scenario. Scenario status will change from "Open" to "Comp" when the scenario is adequate. Edit parameters and evaluate as required until the result is satisfactory and the scenario status is "Comp".

Once a scenario's status is "Comp", pick the Scenario Signoff link to check the scenario and its piping loss calculations. Scenario status should change from "Open" to "Checked". If status remains "Open", pick the Mitigate link to resolve open issues.

Optionally, from the Other Functions dropdown, pick Uncheck Scenario to change the status of all scenario objects to "Open" and begin the evaluating and checking process anew. Scenario objects include the protected system and its equipment, the scenario, and its piping losses.

Checking signing off and un-checking a protected system in a unit: In the protected system view, pick the Check System link to check all contingency scenarios and their piping losses, and all relief devices within the system. If protection is adequate, the system status will change to "System Ok". Pick the System Signoff link to signoff on the protected system.

Optionally, from the Other Functions dropdown, pick Uncheck System to change the status of all objects in the system to "Open" and begin the checking and evaluating process anew. These objects include the protected system and its equipment, the contingency scenarios and their piping losses.

Checking equipment: Once all protected systems have been checked and are of status "Ok", pick the Check Equipment link in either the: unit view equipment browser or protected system browser. The status of all equipment within the unit will change to "Checked".

Signing off and un-checking a unit: Once all protected systems within a unit have been checked and are of status "Ok", and all equipment has been checked and is of status "Checked", pick the Unit Signoff link in the unit view to signoff on the unit.

Optionally, from the Other Functions dropdown in the unit view, pick the Un-check Unit link to change the status of all objects within the unit to "Open" and begin the checking and evaluating process anew. Objects within the unit include all equipment, protected systems, contingency scenarios, and piping losses.

Signing off and un-checking a plant: Once all units within a plant have been checked and are of status "Ok", in the plant view, pick the Plant Signoff link to signoff on the plant.

Optionally, from the Other Functions dropdown in the plant view, pick the Un-check Plant link to change the status of all objects within the plant to "Open" and begin the checking and evaluating process anew. Objects within the plant include all units, equipment, protected systems, contingency scenarios, and piping losses.

Extra-Workflow Procedures: Managing unit, equipment, and protected system graphics Process and instrumentation drawings for systems can be uploaded and viewed in the Evaluation System in a number of the following formats: .gif, .jpeg, .png, .tif, pdf, and NCSA image map. An NCSA link map should use the Evaluation System equipment ID#s to identify its components.

The unit P&ID drawing browser can be used to view and sort the drawings list for a unit locate, add, and delete drawings access the unit P&ID drawing popup access the unit P&ID drawing editor. To view a unit P&ID drawing, do one of the following: In the unit P&ID drawing browser, pick a drawing name. In the equipment view, pick the P&ID Drawing link. In the protected system view, pick the drawing icon for a piece of relief equipment. In the unit P&ID drawing popup or the unit P&ID drawing editor, pick View Image from Other Functions to view an enlarged version of the drawing in a new window. Use the unit P&ID drawing editor to edit drawing name and version, and upload or download drawings or image maps. Use the equipment P&ID drawing selector to create, replace or remove a link between a piece of equipment and a P&ID drawing.

Use the equipment ISO drawing editor to upload, download, or delete an ISO drawing. To view an ISO drawing, do one of the following: In the equipment view, pick the ISO Drawing link; In the equipment ISO drawing popup or the equipment ISO drawing editor, pick the View Image link to view an enlarged version of the drawing in a new window.

Use the system sketch editor to upload, download, or delete a system sketch. To view a system sketch, do one of the following: In the protected system browser, pick a sketch icon; In the protected system view, pick the System Sketch link; In the system sketch view, pick the View Image link to view an enlarged version of the sketch in a new window.

Managing unit, equipment, and system documents: Documents can be uploaded and viewed in the Evaluation System in single or multiple file bundles in one or more of the following formats: .awp, .bkp, .doc, .xls, .pdf, .bmp, .dwg, .gif, .jpeg, .png, .tif, .html, .zip, and .txt. The Evaluation System handles documents for units, equipment, and protected systems in parallel fashion.

Use document browsers to view lists of all documents for a unit, piece of equipment, or system access the document views. Use the document views to view lists of all versions of a document for a unit, piece of equipment, or system enter or edit document details or upload new document versions download a document for editing access the document version views. Use the document version views to view lists of all files within a version of a document for a unit, piece of equipment, or system; enter or edit version details; open individual files within a version of a document; and access the version uploaders. Use the version uploaders to locate and select files to upload as versions of a document for a unit, piece of equipment, or system.

Managing worksheets: To view a selected worksheet, pick the Worksheet link in one of the plant view, equipment view, protected system view, or contingency scenario view piping losses worksheet. Use the worksheet view to update worksheets individually, or use the worksheet updater to update multiple worksheets at a time. To access the worksheet updater at a selected level, from the Other Functions dropdown, use Update W/Sheets in the plant view to update all worksheets in the plant (available only to System Administrators); use unit view, equipment browser, or protected system browser to update all worksheets in the unit; use equipment view to update all worksheets related to the piece of equipment; use protected system view to update all worksheets related to the system (updating worksheets from the protected system view is the easiest way to update the protected system, its equipment and its piping simultaneously); use contingency scenario view to update all worksheets related to the scenario; use piping losses view to update all worksheets related to the piping losses.

Managing revisions: Use the revision browser and revision view to maintain revision control over changes to protected systems. Use the revision browser to view lists of protected systems and their revision numbers for a plant or for a unit within a plant locate protected system revisions by search criteria access the revision view. Use the revision view to: view and update revision details for a protected system; change revision stage; or add a revision to a protected system.

Managing tasks: Use the tasks browser and tasks view to manage user assigned tasks. To access the tasks browser, on the main page, pick Tasks Queue from the Other Functions dropdown. Use the tasks browser to: view the tasks queue for a user or all users; download the tasks queue to Excel; locate tasks by search criteria add new tasks; or access the tasks view. Also use the tasks view to view, enter, or edit task details; or email task information to users Managing Reports: Use the report browser to locate and generate any report, or use the context-sensitive Report link on any page to access the corresponding reports view. Use the report browser to locate and generate any report without navigating to the relevant application page.

To access the report browser, on the main page select Browse Reports from the Other Functions dropdown.

Use the context-sensitive Report links throughout the Evaluation System to access the relevant reports view, then use the reports view to locate and generate the required report.

Tutorials

Various online tutorials are provided for guiding a user. The tutorials are described below. These tutorials provide an example of how to utilize the Evaluation System for analyzing a plant design in a simplified manner. the Evaluation System supports the much more complex configurations of actual plant designs, of course, and thus actual capability is not limited by these examples, which are provided for illustrative purposes only.

Creation Tutorial: This tutorial guides the user through the steps involved in creating and checking a simple one-unit plant containing a compressor, a vessel, and a pressure relief valve.

The steps in this tutorial are: add a new plant to the database; add a new unit to the plant; add new equipment to the unit; add a compressor to the unit; add a vessel to the unit; add a PRV to the unit; add piping and fittings to the PRV; add a protected system to the unit; link the equipment to the protected system; add a contingency scenario calculate piping losses; check and sign off on the protected system; sign off on the unit and plant.

Mitigation Tutorial: This tutorial guides the user through the steps involved in changing a compressor and then mitigating the effects of that change throughout a standard demonstration plant.

The steps in this tutorial include: create a standard demonstration plant; change a compressor; re-check contingency scenarios affected by the compressor change; change a relief valve to mitigate the effects of the compressor change; re-check the system to determine the effects of the relief valve change; and complete the checking and sign-off process.

Fittings Tutorial: This tutorial guides the user through the steps involved in setting up the inlet and outlet piping and fittings for a pressure relief device. The steps in this tutorial are: create a simple shop air plant; add a relief valve navigate to the piping and fittings editor; add, configure, and evaluate inlet fittings; and add and configure outlet fittings.

System Detailed Operation

User Interface Pages: User Interface Pages are used for user interaction with the Evaluation System, and such pages include:

System Login page;
System Logout page;
The Main page;
Plants page;
Units page;
Equipment page;
Protected Systems page;
Contingency Scenarios page;
Worksheets page;
Devices page;
Hazards page;
Pipe Fittings page;
Tasks Queue page; and
Browse Reports page.

Some of these various pages are described in more detail below:

Login Page: Use the login page to: log in to the Evaluation System; log out from the Evaluation System; and for accessing the system administrator login page. A Logout Page is the preferred way to log off the Evaluation System.

The Main Page: The main page is used to locate plants; sort the plant list view; add and delete plants; generate plant and other reports; and provide access to:

Evaluation System handbook;
on-line tutorials, user information and preferences;
multi-tasking interface;
document library (for accessing Evaluation System documents, site documents and industry documents);
worksheet library (for accessing worksheet views or browsers for: plants, device types, pipe fittings, protected systems, scenario hazards, scenario standard OVP types, and piping losses);
reports browser;
send mail to site users utility;
Tasks queue browser;
site load graph (for generating and viewing graphs of transactions, unique users, trouble messages, and locks denied over a selected recent time period); and
site administration page.

Visitor-level users can only access a restricted, read-only version of the Evaluation System main page.

The Multi-Tasking Interface for access to the Evaluation System's multitasking utilities and session. Options include Other Functions including functions of: a Document Library to access the document library and view Evaluation System documents, site documents, and industry documents; A Worksheet Library to access the worksheet library and view and manipulate plant and protected system worksheets and browse pipe fitting, hazard, and piping loss worksheets and standard OVP types; Browse Reports to access the reports browser and generate and print reports on all aspects of the Evaluation System, and to provide a read-only interface to Evaluation System reports for users with Visitor-level access; Send Mail for Users to send email to Evaluation System users; a Tasks Queue to access the tasks queue browser and view, sort and edit tasks lists for System users; a Site Load Graph to access the site load graph and view the graphs of transactions, unique users, trouble messages, and locks denied over a selected recent time period; and Site Administration to access the site administration page and conduct site administration functions (only visible to Site Administrators).

The Plants Page: is used for providing links to the following functions:

A Plant View function for: viewing, entering, or editing plant information; accessing the unit view for units within the plant; creating or deleting units; viewing unit P&ID drawings, equipment, and protected systems; accessing and updating plant worksheets; viewing, entering or editing plant notes; un-checking or re-checking a plant; signing off on a plant that has been checked; and exporting a plant.

A Plant Standard OVPs function for: viewing and sorting a list of plant standard OVP contingency types; adding or deleting an OVP contingency type; adding, sequencing or deleting hazard types for an OVP contingency type; and editing standard notes for an OVP contingency type.

An OVP Standard Notes function for: viewing to enter or edit standard notes for an overpressure contingency scenario. Notes entered here can be applied to contingency scenarios using the scenario note selector.

An Export Plant function for: browsing available plant template document packages and plant document packages in the Plant Template area of the repository; adding a plant template document or plant document to the Plant Template area of the repository; selecting a plant template document or plant document from the Plant Template area of the repository to which to export a plant template document or plant document for the current plant; viewing a selected document from the Plant Template area of the repository; viewing current and previous versions of the current plant's worksheet; generating a plant template document or plant document for export; and/or exporting a generated plant template document or plant document to the Plant Template area of the repository.

An Import Plant function for: browsing available plant template document packages and plant document packages in the Plant Template area of the repository; adding a plant template document or plant document to the Plant Template area of the repository; and/or selecting, viewing and importing a previously exported plant template or plant that has been uploaded and saved as a plant template document package or plant document package in the Plant Template area of the repository.

A Plant Unit Styles function for: selecting a default units style for all values within the plant; an OVP Type Sequencer function for: changing the order in which OVP contingency scenarios are considered and displayed; an OVP Hazard Sequencer function for: changing the order in which OVP contingency hazards are considered and displayed; a Plant or Unit Re-check for rechecking all Open systems in a plant or unit; a Plant Reports function for: creating plant-related reports; a Plant Delete function for: confirm deletion of a plant where access is restricted; a Plant Freeze/Thaw function for: freezing and thawing plants during plant export and import operations; and an Add New Plant Popup function for: creating a new plant and entering basic plant information.

A Units Page provided with links for the following functions:

A Unit View function for: viewing, entering or editing unit information; accessing unit-related information in the unit equipment browser, P&ID drawings browser, protected systems browser, or the document browser; accessing the unit worksheet updater; checking unit equipment; re-checking a unit, un-checking a unit, or signing off on a checked unit; entering or editing unit notes A Unit P&ID Drawing Browser function for: locating, viewing, adding or deleting process and instrumentation drawings for a unit; a Unit P&ID Drawing Popup function for: viewing an uploaded unit drawing if an NCSA link map has been uploaded, to access details for equipment in the unit; a Unit P&ID Drawing Uploader function for: selecting and uploading a unit P&ID image or link map to the System server; a Unit Documents Browser function for: accessing, editing, adding or deleting documents for a unit; a Unit Document Upload function for: locating, selecting and uploading files as versions of unit documents; a Unit Reports function for: viewing and printing unit-related reports and drawings; and A Unit Delete function for: confirming deletion of a unit in a plant.

A Unit P&ID Drawing Editor function for: viewing a unit P&ID drawing or link map; adding a new unit P&ID drawing or link map; uploading or downloading a unit P&ID drawing; uploading or downloading a unit P&ID link map; and accessing equipment details in a unit P&ID link map.

A Unit Document View function for: viewing, entering or editing details for a unit document; downloading a unit document for editing; designating or viewing a launch file for a multiple file unit document; and adding, viewing or deleting unit document versions.

A Unit Document Version function for: viewing, entering, or editing, document version details; uploading or downloading a document version; designating or viewing launch files for multiple file documents; and opening individual files within a document version.

A Unit Equipment Data Import function for: importing data for a new piece of equipment (equipment data should come from a document already uploaded to the Evaluation System through the Document Uploader function), and a Unit Equipment Data Export function for: exporting unit equipment data to a spreadsheet (such as MS Excel) for editing.

An Equipment Page provided with links for the following functions:

An Equipment Browser function for: viewing an equipment list for a plant or a unit within a plant; locating equipment by ID#, type, system, or status; sorting the equipment list; viewing equipment details; adding or deleting equipment; accessing protected system information; initiating an equipment check; importing or exporting equipment data; accessing the equipment redbook editor; updating equipment worksheets; and accessing revision control history.

An Equipment View function for: viewing, entering, or editing equipment details; adding equipment to a unit; managing associated equipment; accessing equipment worksheets, maintenance reports, and documents; viewing and uploading ISO drawings; viewing and selecting P&ID drawings; un-checking equipment and updating worksheets; and for protecting equipment and accessing piping and fittings, piping losses, and findings & deficiencies information.

An Equipment P&ID Drawing Select function for: locating, viewing or editing a unit P&ID drawing; and creating, replacing or removing a link between a unit P&ID drawing and the equipment currently displayed in the equipment view.

An Equipment ISO Drawing Popup function for: viewing an uploaded ISO drawing, and use the Equipment ISO Drawing Uploader function for: selecting and uploading an ISO drawing to the Evaluation System server.

An Equipment ISO Drawing Editor function for: viewing an equipment ISO drawing; uploading or downloading an equipment ISO drawing; and deleting an equipment ISO drawing.

An Equipment Associations function for: locating equipment to associate; accessing equipment details; creating an equipment association; and clearing an equipment association.

An Equipment Piping Browser function for: viewing inlet and outlet piping and fittings lists for a piece of equipment; adding or deleting piping and fittings; accessing and editing piping and fittings details; re-sequencing inlet and outlet piping and fittings; accessing the equipment piping editor; viewing piping losses; viewing ISO and P&ID drawings; evaluating piping and fittings; and updating piping and fittings worksheets and viewing or hiding worksheet information messages.

An Equipment Piping Editor function for: add, editing and deleting piping and fittings for a piece of equipment; evaluating piping and fittings; accessing and editing piping and fittings details; re-sequencing piping and fittings; viewing piping losses; viewing ISO and P&ID drawings; and updating piping and fittings worksheets and view or hide worksheet information messages and fitting notes.

An Equipment Piping View function for: viewing, entering, editing or evaluating inlet and outlet piping and fitting details; and adding new piping and fittings.

An Equipment Piping Sequencer function for: changing the order in which piping and fittings are considered and displayed: for inlet, from entrance to device; and for outlet, from device to exit.

An Equipment Redbook function for: viewing protecting equipment lists for a unit; locating protecting equipment by ID#, system, or status; sorting the protecting equipment list; and viewing or editing redbook parameters for protecting equipment.

An Equipment Piping Losses function for: accessing piping losses information for each contingency scenario that is applied to a piece of protecting equipment's protected system.

An Equipment Findings & Deficiencies function, for a piece of protecting equipment within a system, for: viewing, enter, or edit findings information; creating, editing, sequencing, and deleting equipment deficiencies; accessing equipment worksheets; viewing ISO and P&ID drawings; accessing piping and fittings or piping losses information; accessing maintenance information or equipment documents; accessing protected system information.

An Equipment Deficiency Sequencer function for: changing the order in which deficiencies are displayed; and an Equipment Documents function for: viewing, entering, editing, adding or deleting documents for a piece of equipment.

An Equipment Documents View function for: viewing, entering or editing equipment document details; downloading a document for editing; designating or viewing a launch file for a multiple file document; and adding, viewing, or deleting document versions.

An Equipment Documents Version function for: viewing, entering or editing details for a version of an equipment document; uploading or downloading an equipment document version; designating or viewing launch files for multiple file documents; and opening individual files within a document version.

An Equipment Documents Uploader function for: locating, selecting and uploading files as versions of equipment documents; and an Equipment Maintenance View function for: viewing, entering or editing record details for maintenance reports.

An Equipment Maintenance function for: viewing maintenance history; accessing maintenance details; and adding or deleting maintenance history entries.

An Equipment Reports function for: viewing a variety of equipment-related reports; and an Equipment Browser function.

A Protected Systems Page provided with links for the following functions:

A Protected System Browser function for: viewing protected systems lists for a plant or units within a plant; locating protected systems by name or status; sorting the protected systems list; viewing protected system details; adding or deleting a protected system; accessing revision history information; initiating a unit re-check; and updating protected system worksheets.

A Protected System View function for: viewing, entering or editing protected system details; adding a new protected system to a unit; viewing, adding, editing or deleting links to relief devices, protected equipment, OVP sources, and ancillary equipment; viewing relief or protected equipment P&ID drawings; adding, applying, editing, re-sequencing or deleting contingency scenarios; uploading or viewing a protected system sketch; accessing protected system documents; accessing or updating protected system worksheets; checking protected system equipment or initiate a system-wide re-check; and signing off on a protected system.

A Protected System Sketch function for: viewing an uploaded protected system sketch, and if an NCSA link map has been uploaded, for accessing equipment details for the system.

A System Sketch Editor function for: uploading, downloading or deleting a system sketch; uploading, downloading, or deleting a system link map; and accessing equipment details for system link maps.

A System Sketch Uploader function for: selecting and uploading an image or link map to the Evaluation System server and an Add Standard OVPs to System function for: setting defaults for standard OVP scenarios and adding the OVPs to a protected system.

An Impact Analysis function for: evaluating the consequences of updating the worksheets associated with the protected system to their current versions. Updating the worksheets for a protected system can affect its audit status since a change in standards may make an existing system non-compliant. This function enables the impact of the worksheet update to be evaluated without actually doing so.

A Link Equipment View function for: locating available relief equipment and sort the available relief equipment list and for linking available relief equipment to a protected system.

A System Scenario Adjustor function for: marking contingency scenarios as applicable or not applicable by category for a protected system, and for deleting contingency scenarios by category for a protected system; and a Scenario Sequencer function for: changing the order in which contingency scenarios are considered and displayed.

A System Scenario Notes function for: viewing, entering or editing custom notes for contingency scenarios associated with a protected system; selecting standard notes for contingency scenarios; and applying and re-sequencing contingency scenarios.

A System Revisions Browser function for: viewing revisions lists for a plant or units within a plant; locating revisions by name, system status, revision number, status, or stage, and/or the user for which they are queued; sorting the revisions list; and accessing revision details.

A System Revision View function for: viewing protected system revision history; and entering, editing and deleting protected system revisions.

A Send Revision Mail function for: emailing revision notices to Evaluation System users, and a System Impact Analysis function; and a System Documents Browser function for accessing, editing, adding and deleting documents for a protected system.

A System Document View function for: viewing, entering or editing system document details; downloading a document for editing; designating or viewing a launch file for a multiple file document; and adding, viewing, or deleting document versions.

A System Document Version function for: viewing, entering or editing details for a system document version; uploading or downloading a document version; designating or viewing launch files for multiple file documents; and opening individual files within a document version.

A System Document Uploader function for locating and selecting files to upload as versions of system documents; a Protected System Reports function for generating and viewing a variety of protected system-related reports; and a Protected System Browser function.

A Contingency Scenarios Page provided with links for the following functions:

A Contingency Scenario View function for: viewing, entering or editing contingency scenario details; entering or selecting contingency scenario parameters; calculating piping losses for a contingency scenario; and evaluating or signing off on a contingency scenario.

A Scenario Notes Selector function for selecting standard notes to attach to a contingency scenario; a Scenario Variable Dependency function for viewing, creating, or editing dependency links between contingency scenario parameters and parameters in other worksheets; a Scenario Piping Losses function for updating, editing, and computing scenario piping losses for each relief device to which the contingency scenario is applied; a Piping Losses Worksheet function for updating, editing, and computing piping losses for a contingency scenario applied to a single relief device; and a Contingency Scenario Reports function for generating and viewing scenario reports.

A Worksheets Page provided with links for the following functions:

A Worksheet View function for: viewing worksheets for plants, equipment, protected systems, contingency scenarios, and piping losses; selecting worksheet versions; accessing worksheet specifications; and viewing source or object code for the worksheet.

A Worksheet Updater function for: generating and viewing a worksheet updating plan; and updating worksheets to the most recently uploaded versions A Units Style Selector function for: converting and displaying the selected value in a new units style. Note that only the display value will be changed, not the basis value used in calculations.

A Worksheet Variable Information function for accessing detailed information about a parameter; and a Worksheet Specification View function for viewing to access worksheet variables and worksheet calculations in source or object code for plants, protected systems, and/or piping losses.

A Worksheet Reports View function for: generating and viewing worksheet values and worksheet specification reports for plants, equipment, protected systems, contingency scenarios and/or piping losses.

A Devices Page provided with links for the following functions:

A Device Worksheet Browser function for: accessing device worksheets and adding or deleting device worksheets; a Device Worksheet View function for: viewing device worksheet variables and worksheet calculations code for System Administrators, and selecting a protection function for a device; and a Devices Reports function for: generating and viewing device worksheet specification reports.

A Hazards Page provided with links for the following functions:

A Hazard Browser function for: accessing hazard worksheets; adding or deleting hazards; and accessing default plant OVP contingencies.

A Hazard View function for viewing hazard worksheet specifications and hazard source or object code, and entering or editing hazard details; a Hazard Reports function for: generating and viewing hazard reports; and a Default OVP Contingencies function for accessing default plant OVP contingencies.

A Pine Fittings Page provided with links for the following functions:

A Pipe Fitting Browser function for: viewing the pipe fitting type worksheets list; accessing fitting worksheets; and adding and deleting fitting worksheets A Pipe Fitting View function for: viewing fitting worksheet specifications; viewing fitting source or object code; and entering or editing fitting details and specify defaults and width variance.

A Pipe Fitting Reports function for: generating and viewing fitting reports; and a Piping Losses Worksheets function for accessing piping losses worksheet specifications.

A Tasks Queue Page provided with links for the following functions:

A Tasks Queue Browser function for: viewing task lists for users; locating tasks by user, user role, or task status; sorting the task list; viewing task details; adding and deleting tasks; and downloading the task list to a spreadsheet (such as MS Excel).

A Tasks View function for: viewing, entering, or editing task details, and preparing task notices for email; and a Tasks Send Mail function for: emailing task notices to Evaluation System users.

A Browse Reports Page provided with links for the following functions:

A Reports Browser function for: selecting, generating, displaying and printing Evaluation System reports, where the reports browser provides a read-only interface to System reports for users with Visitor-level access; and a System Selector function for: selecting protected systems for use in the reports browser.

The Evaluation System supports at least three types of graphics files which can be uploaded, viewed and edited. These graphics files include unit process and instrumentation (P&ID) drawings, equipment isometric (ISO) piping drawings, and protected systems sketches. Various graphics formats are supported (such as gif, jpg, png, tif and pdf, for example).

A fourth type of file, the NCSA link map, can be created and uploaded along with unit P&ID drawings and protected system sketches. The NCSA link map feature can be used to create hotlinks from the pieces of equipment illustrated in a graphic to the equipment view to display each piece of equipment's details. An equipment P&ID drawing selector function is provided to create direct links from pieces of equipment in the equipment view to the unit P&ID drawing in which they are illustrated.

Once a unit P&ID drawing has been uploaded, direct links can be created from the equipment view from each piece of equipment to the drawing in which it is illustrated.

The Evaluation System provides a document library for system-wide documents, plus repositories for unit, equipment, and protected system documents. The document library is preferably a read-only resource for most users. Only system administrators is typically permitted to upload, edit, or delete these materials.

The Evaluation System manages unit, equipment, and protected system documents in parallel fashion. The Evaluation System documents can be uploaded, managed and accessed as: awp. bkp. doc. xls. pdf. bmp. dwg. gif. jpeg. png. tif, html, and txt files, for example. Multiple file bundles, such as .zip files, for which a view or launch file can be designated, are also supported. Furthermore, multiple versions of the same document can also be supported.

Document version views are provided for units, equipment, and protected systems to display document version details and a list of files within a document version.

Document uploaders are provided for units, equipment, and protected systems for use to access local standard browsers and to transmit selected document files or multiple file bundles to the Evaluation System server.

Various additional support functions are provided as described below:

A Site Administration function is provided to access the person, repository, database, and backups browsers access the site configuration, site availability, install updates, database administration, import plant, and freeze plant utilities access the site load graph set token expiry options view log file statistics and access log files launch any Evaluation System page A Site Configuration function is provided for setting access levels for add plant, mail users, and tasks queue; and setting units system for new plants access the parameters browser.

A Configuration Browser function is provided for viewing, editing, adding and deleting site configuration parameters. A Configuration View function is used for editing and adding site configuration parameters.

A Person Browser function is provided for viewing person lists; accessing person details; adding and deleting persons and email users. a Person View function is provided for viewing, entering, or editing person details; and setting access levels and batch email inclusion for a person. A Logins Browser function is provided for viewing and sorting the logins log.

A Trouble Log Analysis Browser is provided for viewing and sorting the trouble log analysis table; and accessing trouble log analysis details Accessing the Trouble Log Analysis Browser To access the trouble log analysis browser In the trouble log browser, pick the Analyze Trouble link.

A Site Availability Utility is provided for entering and activating a down time message; and adding, editing, or deleting site down times.

A Database Administration Utilities function is used for editing database configuration parameters; converting database versions; re-indexing database tables; clearing persistent locks; reaping old or unreferenced worksheet specifications; and accessing the current database version.

A Reap Worksheet Specifications function is used for deleting unused worksheet specifications. A Reap Worksheet Files function is also provided. A Database Browser function is provided for locating database objects by class or location. A Backups Manager and a Page Timing Statistics function is also provided.

A Site Administration Reports function is provided for accessing the site administration reports.

A Repository Area Browser function is provided for viewing the repository area list access repository area details, and adding and deleting repository areas.

A Repository Area View function is provided for viewing, entering or editing repository area details; sorting and sequencing the area package list; and adding, viewing, launching or deleting area packages.

An Area Packages Sequencer function is provided for changing the order in which area packages are considered and displayed.

A Repository Package View function is provided for viewing, entering or editing area package details; downloading a package for editing; designating or viewing a launch file for a package; and adding, viewing or deleting package versions.

Pick the Add Package link to add a package and access a blank repository package view in which to enter new package details.

A Repository Version View function is used for viewing, entering or editing details for a version of a repository area package; uploading or downloading a package version; designating or viewing launch files for a package; and opening individual files within a package version.

A Repository Package Uploader function for locating and selecting files to upload as versions of repository area packages.

The Evaluation System in its preferred embodiments can be installed in both MS Windows and Unix/Linux environments.

The Evaluation System report generation subsystem will be able to generate a number of reports, including:

A. Library Reports including:
Plants List Report;
Default Std. OVPs;
Devices in Database;
Hazards in Database;
Pipe Fittings List;
ANSI Pipe Schedule; and
Std. Fitting Heights.
B. Plant Reports including:
Plant Data Sheet;
Plant Units System;
Plant Std. OVPs;
Plant/Unit Recheck; and
Impact Analysis.
C. Unit Reports including:
Unit Data Sheet;
Unit Drawings;
Unit Drawing;
Unit Equipment List;
Relief Device Summary;
Unit Systems List;
Unit Systems Stat's; and
Unit Documents.
D. Equipment Reports including:
Equipment Data Sheet;
Equip't ASME Data Sheet;
Equip't ISA CV Data Sheet;
Equip't ISA PRV Data Sheet;
Equip't ISA RD Data Sheet;

Equipment ISO Drawing;
Equipment P&ID Drawing;
Relief Device Design Record;
Relief Device Worksheet;
Contingency Analysis;
Contingency Summary;
Contingency Calculations;
Contingency Calc. Summary;
Equip't Design & Selection;
Piping and Fittings;
Piping Losses;
Findings & Deficiencies;
Equipment Documents;
Equipment Document;
Document Version;
Equip't Maintenance List; and
Equip't Maintenance Item.
E. Protected System Reports including:
System Summary;
System Flow Sketch;
Contingency Analysis;
Contingency Summary;
Contingency Calc's;
System Piping Losses;
System Revisions; and
System Documents.
F. Contingency Reports including:
Scenario Calculations; and
Scenario Piping Losses.
G. Worksheet Reports
H. Repository Reports including:
Repository Areas;
Repository Area;
Repository Package; and
Repository Version.
I. Tasks Queue Reports
J. Person Reports including:
Users List;
Admin. Details; and
User's Details.
K. Administration Reports including:
Site Configuration Report;
Site Transactions Report;
Database Statistics Report; and
Document Statistics Report.

The invention has been described hereinabove using specific examples and embodiments; however, it will be understood by those skilled in the art that various alternatives may be used and equivalents may be substituted for elements and/or steps described herein, without deviating from the scope of the invention. Modifications may be necessary to adapt the invention to a particular situation or to particular needs without departing from the scope of the invention. It is intended that the invention not be limited to the particular implementations and embodiments described herein, but that the claims be given their broadest interpretation to cover all embodiments, literal or equivalent, disclosed or not, covered thereby.

Finally, the Evaluation System is designed to support the following Industry standards represented by the following documents, all incorporated by reference in their entirety:
API (American Petroleum Institute)
Standards
    ANSI B16.34
    ANSI B16.5—Pipe Flanges & Fittings
    API Std 520—Part 1—Design Installation of Pressure Relieving Systems
    API Std 520—Part 2—Sizing, Selection & Installation of Pressure Relief Devices
    API Std 521—Guide For Pressure Relieving & Depressuring Systems
    API Std 526—Flanged Steel Pressure Relief Valves
    API Std 527—Seat Tightness of Pressure Relief Valves
    API 576—Inspection of Pressure Relief Devices
    API-2000—Venting Atmosphere and Low-pressure Storage Tanks
American Society of Mechanical Engineers
Regulations
    ASME Section I—Power Boilers
    ASME Section III—Rules for Construction of Nuclear Facility Components
    ASME Section VIII—Div 1—Pressure Vessels
    ASME NB-18—National Board Pressure Relief Device Certifications
Occupational Safety and Health Administration
    1910.119—Process Safety Management of Highly Hazardous Chemicals
Crane Technical Paper
    Flow of Fluids Through Valves, Fittings, and Pipes

What is claimed is:

1. A method performed using a computerized system comprising a database and a processor executing software for supporting auditing of a process system, said process system comprising a plurality of process equipment and one or more protection devices for protecting the process system, said method comprising the steps of:
storing equipment description information in the database, said equipment information describing said plurality of process equipment and also describing said one or more protection devices, wherein said equipment description information includes information identifying a source of each one of the protection devices, and wherein said equipment information includes information about changes that have been made to the process system;
storing physical properties data in the database, said physical properties data pertaining to said process equipment and also pertaining to said one or more protection devices;
automatically determining compliance of the one or more protection devices for protecting the process system by using the physical properties data pertaining to the equipment information to determine said compliance with respect to auditing requirements, wherein determining said compliance includes automatically evaluating impacts of said changes made in the process system; and
automatically generating an auditing report indicating said compliance with respect to said auditing requirements for the process system, wherein said auditing report includes information about the impacts of said changes.

2. The method of claim 1, wherein said method further includes the step of tracking a plurality of changes that have been made to the process system, and wherein said auditing report includes a description of said changes for supporting said auditing.

3. The method of claim 2, wherein said report meets OSHA 29 CFR 1910.119 documentation guidelines.

4. The method of claim 2, wherein said description of said changes includes an impact assessment as to whether any of said plurality of changes impact the protection of said process system.

5. The method of claim 4, wherein said impact assessment includes an assessment of safety compliance with respect to said process system.

6. The method of claim 1, wherein said auditing requirements are based on one or more of OSHA 29 CFR 1910.119, ASME, and/or API standards.

7. The method of claim 1, wherein said auditing requirements are based on all of OSHA 29 CFR 1910.119, ASME, and API standards.

8. The method of claim 1, wherein said report meets OSHA 29 CFR 1910.119 documentation guidelines.

9. The method of claim 1, wherein said report includes a certification of one or more of said plurality of process equipment and/or one or more of said protection devices.

10. The method of claim 1, wherein information on the compliance status of one or more of said plurality of process equipment and/or one or more of said protection devices is stored in said database.

11. The method of claim 1, further comprising the steps of:
storing one or more worksheets in said database, wherein said one or more worksheets are utilized for determining said compliance; and
allowing a user to update one or more of said one or more worksheets with said computerized system tracking said update, wherein
said auditing report includes an impact assessment for evaluating the consequences of said update.

12. The method of claim 11, wherein said update of one or more of said one or more worksheets is performed in response to a change in industry standards.

13. The method of claim 1, further comprising the steps of:
storing one or more worksheets in said database, wherein said one or more worksheets are utilized for determining said compliance; and
allowing a user to test a proposed update to one or more of said one or more worksheets with said computerized system tracking said update, wherein
said auditing report includes an impact assessment for evaluating the potential consequences of said proposed update.

14. The method of claim 11, wherein said proposed update of one or more of said one or more worksheets is tested in response to a change in industry standards.

15. The method of claim 11, further comprising the step of said computerized system providing instructions to an auditor to guide the auditor through workflow required to perform said auditing.

16. The method of claim 15, wherein said instructions are provided to the auditor over the Internet.

17. The method of claim 1 wherein said software is adapted for execution on said processor for performing said method.

18. The method of claim 1, further comprising the step of linking said physical properties data with said equipment description information in said database, wherein said automatically determining the compliance of the one or more protection devices for protecting the process system utilizes the physical properties data linked to the equipment information.

19. A method performed using a computerized system comprising a processor executing software for supporting auditing of a process system, said process system comprising a plurality of process equipment and one or more protection devices for protecting the process system, said method comprising the steps of:
storing equipment description information in the database, said equipment information describing said plurality of process equipment and also describing said one or more protection devices, wherein said equipment description information includes information identifying a source of at least one of the protection devices and/or the plurality of process equipment;
storing physical properties data in the database, said physical properties data pertaining to said process equipment and also pertaining to said one or more protection devices;
linking said physical properties data with said equipment description information in said database;
tracking a plurality of changes that have been made to the process system;
storing one or more worksheets in said database,; and
allowing a user to update, or provide a proposed update, to one or more of said one or more worksheets;
automatically determining compliance of the one or more protection devices for protecting the process system by using the physical properties data linked to the equipment information and using one or more of said one or more worksheets for determining said compliance to determine said compliance of said changes and/or said update or said proposed update, with respect to auditing requirements; and
automatically generating an auditing report indicating said compliance with respect to said auditing requirements for the process system, wherein
said auditing report includes a description of said changes for supporting said auditing requirements, and wherein
said auditing report also includes an impact assessment for evaluating the potential consequences of said update or proposed update.

20. The computerized system performing the method of claim 19, wherein said software is adapted for execution on said processor for performing said method.

21. A computerized system for supporting auditing of a process system, said process system comprising a plurality of process equipment and one or more protection devices for protecting the process system, said system comprising:
a database adapted for storing equipment description information describing said plurality of process equipment and also describing said one or more protection devices, wherein said equipment description information includes information identifying a source of at least one of the protection devices and/or the plurality of process equipment;
said database also being adapted for storing physical properties data pertaining to said process equipment and also for storing data pertaining to said one or more protection devices;
said database also being adapted for storing one or more updates to said process system and/or updates to the protection devices;
a processor executing software adapted for automatically determining compliance of the one or more protection devices for protecting the process system with respect to said update(s) by using the physical properties data pertaining to the equipment information to determine said compliance with respect to auditing requirements; and
said processor executing additional software adapted for automatically generating an auditing report indicating said compliance with respect to said auditing requirements for the process system.

22. The system of claim 21, wherein said system is adapted to track a plurality of changes that have been made to the process system in said database, and wherein said auditing report includes a description of said changes for supporting said auditing.

23. The system of claim 22, wherein said description of said changes includes an impact assessment as to whether any of said plurality of changes impact the protection of said process system.

24. The system of claim 23, wherein said impact assessment includes an assessment of safety compliance with respect to said process system.

25. The system of claim 21, wherein said auditing requirements are based on one or more of OSHA 29 CFR 1910.119, ASME, and/or API standards.

26. The system of claim 21, wherein said report includes a certification of one or more of said plurality of process equipment and/or one or more of said protection devices.

27. The system of claim 21, wherein information on the compliance status of one or more of said plurality of process equipment and/or one or more of said protection devices is stored in said database.

28. The system of claim 21, further comprising:
said database being adapted for storing one or more worksheets, wherein said one or more worksheets are utilized for determining said compliance; and
means for allowing a user to update one or more of said one or more worksheets with said computerized system being adapted for tracking said update, wherein
said auditing report includes an impact assessment for evaluating the consequences of said update.

29. The system of claim 28, wherein said update of one or more of said one or more worksheets is based on a change in industry standards.

30. The system of claim 21, further comprising:
said database being adapted for storing one or more worksheets, wherein said one or more worksheets are utilized for determining said compliance; and
means for allowing a user to test a proposed update to one or more of said one or more worksheets with said computerized system tracking said update, wherein
said auditing report includes an impact assessment for evaluating the potential consequences of said proposed update.

31. The system of claim 21, wherein said computerized system is adapted for providing instructions to an auditor to guide the auditor through workflow required to perform said auditing.

32. The system of claim 31, wherein said instructions are provided to the auditor over the Internet.

33. A computer readable storage medium for storing software for execution on a computer for performing a method for supporting auditing of a process system, said process system comprising a plurality of process equipment and one or more protection devices for protecting the process system, said software comprising instructions for performing the method comprising the steps of:
storing equipment description information in a database, said equipment information describing said plurality of process equipment and also describing said one or more protection devices, wherein said equipment description information includes information identifying a source of at least one of the protection devices and/or process equipment;
storing physical properties data in the database, said physical properties data pertaining to said process equipment and also pertaining to said one or more protection devices;
tracking a plurality of changes that have been made to the process system;
storing one or more worksheets in said database,; and
allowing a user to update, or provide a proposed update, to one or more of said one or more worksheets;
automatically determining compliance of the one or more protection devices for protecting the process system by using the physical properties data pertaining to the equipment information and using one or more of said one or more worksheets for determining said compliance to determine said compliance with respect to auditing requirements wherein determining said compliance includes automatically evaluating impacts of said changes made in the process system; and
automatically generating an auditing report indicating said compliance with respect to said auditing requirements for the process system, wherein
said auditing report includes a description of said changes for supporting said auditing requirements, and wherein
said auditing report also includes an impact assessment for evaluating the potential consequences of said update or proposed update.

34. A method performed using a computerized system comprising a database and a processor executing software for supporting auditing of a process system, said process system comprising a plurality of process equipment and one or more protection devices for protecting the process system, said method comprising the steps of:
storing equipment description information in the database, said equipment information describing said plurality of process equipment and also describing said one or more protection devices, wherein said equipment description information includes information identifying a source of each one of the protection devices;
storing physical properties data in the database, said physical properties data pertaining to said process equipment and also pertaining to said one or more protection devices;
providing access to said system to an auditor that is auditing the process system for determining whether said process system is in compliance with auditing requirements;
determining compliance of the one or more protection devices for protecting the process system by using the physical properties data pertaining to the equipment information to determine said compliance with respect to said auditing requirements for providing a compliance indication of said process system to said auditor.

35. The method of claim 34, wherein said method further includes the step of tracking a plurality of changes that have been made to the process system, and wherein said auditing report includes a description of said changes for supporting said auditing.

36. The method of claim 35, wherein said report meets OSHA 29 CFR 1910.119 documentation guidelines.

37. The method of claim 35, wherein said description of said changes includes an impact assessment as to whether any of said plurality of changes impact the protection of said process system.

38. The method of claim 37, wherein said impact assessment includes an assessment of safety compliance with respect to said process system.

39. The method of claim 34, wherein said report includes a certification of one or more of said plurality of process equipment and/or one or more of said protection devices.

40. The method of claim 34, wherein information on the compliance status of one or more of said plurality of process equipment and/or one or more of said protection devices is stored in said database.

41. The method of claim 34, further comprising the steps of:
- storing one or more worksheets in said database, wherein said one or more worksheets are utilized for determining said compliance; and
- allowing a user to update one or more of said one or more worksheets with said computerized system tracking said update, wherein
- said auditing report includes an impact assessment for evaluating the consequences of said update.

42. The method of claim 41, wherein said update of one or more of said one or more worksheets is performed in response to a change in industry standards.

43. The method of claim 34, further comprising the step of said computerized system providing instructions to an auditor to guide the auditor through workflow required to perform said auditing.

44. The method of claim 34, further comprising the step of linking said physical properties data with said equipment description information in said database, wherein said automatically determining the compliance of the one or more protection devices for protecting the process system utilizes the physical properties data linked to the equipment information.

* * * * *

UNITED STATES PATENT AND TRADEMARK OFFICE
CERTIFICATE OF CORRECTION

| | | |
|---|---|---|
| PATENT NO. | : 8,090,460 B2 | Page 1 of 1 |
| APPLICATION NO. | : 12/486366 | |
| DATED | : January 3, 2012 | |
| INVENTOR(S) | : Josh Kolenc et al. | |

It is certified that error appears in the above-identified patent and that said Letters Patent is hereby corrected as shown below:

Column 3, Line 1, please insert before FIGS 8A --The parent application, U.S. Application Serial Number 11/016,001 shows--.

Column 30, Line 27, please delete "Pine" and insert --Pipe--.

Signed and Sealed this

Thirteenth Day of November, 2012

David J. Kappos
*Director of the United States Patent and Trademark Office*